(12) United States Patent
Arai et al.

(10) Patent No.: US 7,069,902 B2
(45) Date of Patent: Jul. 4, 2006

(54) SIMULTANEOUS FORMING METHOD OF THROTTLE BODY AND THROTTLE VALVE

(75) Inventors: Tsuyoshi Arai, Kariya (JP); Naoki Hiraiwa, Toyokawa (JP); Isao Makino, Chiryu (JP); Katsuya Torii, Anjo (JP)

(73) Assignee: Denso Corporation (JP)

( * ) Notice: Subject to any disclaimer, the term of this patent is extended or adjusted under 35 U.S.C. 154(b) by 51 days.

(21) Appl. No.: 10/902,827

(22) Filed: Aug. 2, 2004

(65) Prior Publication Data

US 2005/0022781 A1 Feb. 3, 2005

(30) Foreign Application Priority Data

Aug. 1, 2003 (JP) ............................. 2003-285434

(51) Int. Cl.
*F02D 9/08* (2006.01)
*F12K 1/22* (2006.01)
*B21D 51/16* (2006.01)

(52) U.S. Cl. .................... 123/337; 251/305; 29/890.12
(58) Field of Classification Search ................ 123/337, 123/361, 399, 403; 251/305, 306; 29/888.01, 29/890.12, 527.1
See application file for complete search history.

(56) References Cited

U.S. PATENT DOCUMENTS

| 5,304,336 A | 4/1994 | Karlsson et al. ............. 264/242 |
| 6,516,776 B1 * | 2/2003 | Kai et al. .................... 123/337 |
| 6,626,421 B1 * | 9/2003 | Torii et al. .................. 251/305 |

FOREIGN PATENT DOCUMENTS

| JP | 4-8833 | * | 1/1992 |
| JP | 11-210503 | * | 8/1999 |
| JP | 2000-202866 A | * | 7/2000 |

* cited by examiner

Primary Examiner—Willis R. Wolfe, Jr.
(74) Attorney, Agent, or Firm—Nixon & Vanderhye PC

(57) ABSTRACT

An electrically controlled throttle apparatus is constructed with a throttle body and a throttle valve that are simultaneously formed in the same dies. The throttle valve is rotatably assembled in a bore wall part of the throttle body while the throttle valve is rotated by a predetermined rotation angle θ with respect to a rotation angle 0° corresponding to its full close position. Besides, a clearance is formed between the throttle body and the throttle valve around a portion in the vicinity of a throttle shaft of the throttle valve and a shaft hole of the throttle body. Furthermore, a joint is inserted between the throttle shaft and the shaft hole in the forming process thereof. Thus, the throttle body and the throttle valve can be separated by the molding dies and the joint, and the throttle body and the throttle valve can be prevented from welding to each other in a forming process thereof.

21 Claims, 23 Drawing Sheets

US 7,069,902 B2

SIMULTANEOUS FORMING METHOD OF THROTTLE BODY AND THROTTLE VALVE

CROSS REFERENCE TO RELATED APPLICATION

This application is based on and incorporates herein by reference Japanese Patent Application No. 2003-285434 filed on Aug. 1, 2003.

FIELD OF THE INVENTION

The present invention relates to a forming method of a throttle body used for an internal combustion engine mounted in a vehicle. Especially, the present invention relates to a forming method of a throttle body, in which a throttle valve and a throttle body are substantially simultaneously formed in the same dies.

BACKGROUND OF THE INVENTION

In an electrically controlled throttle apparatus shown in FIGS. 22 and 23, a driving device such as a motor controls an opening degree of a throttle valve 102 in accordance with a position of an accelerator pedal stepped by a driver. In the throttle apparatus, a gap is formed between a bore inner periphery of a substantially tubular throttle body 101 and an outer circumferential periphery of a throttle valve 102, and the gap has a large influence of an airtightness of the throttle apparatus when the throttle valve 102 is in its full close position.

Conventionally, the throttle body 101 and the throttle valve 102 are independently manufactured in each different processes. Subsequently, a manufactured throttle valve 102 is combined with a manufactured throttle body 101 in accordance with an inner peripheral dimension of the manufactured throttle body 101 in a downstream process. Alternatively, a manufactured throttle body 101 is combined with a manufactured throttle valve 102 in accordance with an outer circumferential dimension of the throttle valve 102 in a downstream process. Thus, a predetermined gap is obtained between the bore inner periphery of the throttle body 101 and the outer circumferential periphery of a throttle valve 102. A throttle shaft 103 integrally rotates with the throttle valve 102. Both of the ends of the throttle shaft 103 are rotatably supported by cylindrical valve bearings 104 provided in the throttle body 101.

In molding methods according to JP-A-5-141540 and JP-B2-3315135, a manufacturing process of the throttle body and the throttle valve is reduced. In the molding methods, the throttle body 101 and the throttle valve 102 shown in FIG. 24 are integrally molded of a resinous material in the same molding dies. At first, the substantially tubular throttle body 101 is integrally molded of a resinous material. Subsequently, inner periphery (bore inner periphery) of the throttle body 101 is used as a part of a molding die molding the throttle valve 102, and the throttle valve 102 is molded. Thus, a shape of an outer circumferential periphery of the throttle valve 102 is adapted to a shape of the bore inner periphery of the throttle body 101 in the above molding methods.

FIGS. 25A to 25C are cross-sectional views showing molding process of the throttle valve 102 in the throttle body 101 using the above molding methods. The throttle body 101 is molded of a resinous material in a body cavity formed in a fixed dies 111, 112 and a moving die 113 (FIG. 25A). The molded throttle body 101 is gradually cooled in the body cavity to be solidified. Subsequently, the movable die 113 is slid to its backward position in order to form a valve cavity, into which a resinous material is filled (FIG. 25B). The throttle valve 102 is molded of a resinous material in the throttle body 101 (FIG. 25C).

However, in this molding process, the throttle body 101 is partially used as a molding dies for molding the throttle valve 102. Therefore, the throttle body 101 and the throttle valve 102 cannot be simultaneously molded in one molding process, that is, sequential molding process is needed. Besides, the throttle body 101 needs to be cooled and solidified in the molding dies before molding the throttle valve 102, and this molding process needs a cooling period. Accordingly, the molding process becomes long. Besides, thermal cycle may be degraded due to the cooling process of the throttle body 101 received in the molding dies. Furthermore, the outer circumferential periphery of the throttle valve 102 may weld to the throttle body 102 in the outer circumferential periphery of the throttle valve 102.

SUMMARY OF THE INVENTION

In view of the foregoing problems, it is an object of the present invention to propose a forming method, in which a throttle valve is simultaneously formed (molded) with a throttle body using the same forming dies (molding dies), and is internally connected to the throttle body to be assembled into a vehicular throttle apparatus. Specifically, the throttle valve is formed in the throttle body when the throttle valve is in a position, in which the throttle valve is inclined from its full-closed position by a predetermined angle. That is, the throttle valve is formed in the throttle body when the throttle valve is in a position excluding the full close position. Here, when the throttle valve is in the full close position, a gap formed between the throttle valve and the throttle body becomes a predetermined minimum gap. Besides, predetermined gaps are formed between portions around both ends of a throttle shaft of the throttle valve and shaft holes formed in the throttle body that are rotatably connected with each other. Therefore, the throttle valve and the throttle body are separated at the predetermined gaps by the forming dies, so that the throttle valve and the throttle body can be simultaneously formed without using the above sequential forming process (molding process). Additionally, predetermined sufficient gaps are formed between the throttle valve and the throttle body, so that portions of the dies forming the gaps between the throttle valve and the throttle body can become thick. Therefore, durability of the forming dies can be enhanced. Furthermore, bearing parts, which are formed of a different material from a material of the throttle body and the throttle valve, supporting the throttle shaft of the throttle valve can be inserted between the throttle valve and the throttle body. The bearing parts can be inserted and formed in the throttle body, simultaneously. In this case, the throttle valve and the throttle body can be separated by the bearing parts formed of the different material.

According to the present invention, a throttle apparatus for an internal combustion engine includes a substantially tubular throttle body and a substantially disc-shaped throttle valve. The throttle valve has a rotation center substantially perpendicular to a central axis of the throttle body. The throttle apparatus is formed by a forming method, in which the throttle body and the throttle valve are substantially simultaneously formed using the same dies. Specifically, the throttle body rotatably receives the throttle valve that is rotated by a predetermined angle with respect to a full close position, in which the throttle valve and the throttle body forms a minimum gap therebetween, in a forming process of the forming method. Here, intake air introduced into the internal combustion engine flows through the throttle body along the central axis of the throttle body. The throttle body has a valve bearing that rotatably supports at least one end of the rotation center of the throttle valve. The throttle body has at least one of a groove, a substantially flat section and a substantially linear section, which is located in a bore inner periphery in the vicinity of the valve bearing, to be parallel to the central axis of the throttle body.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
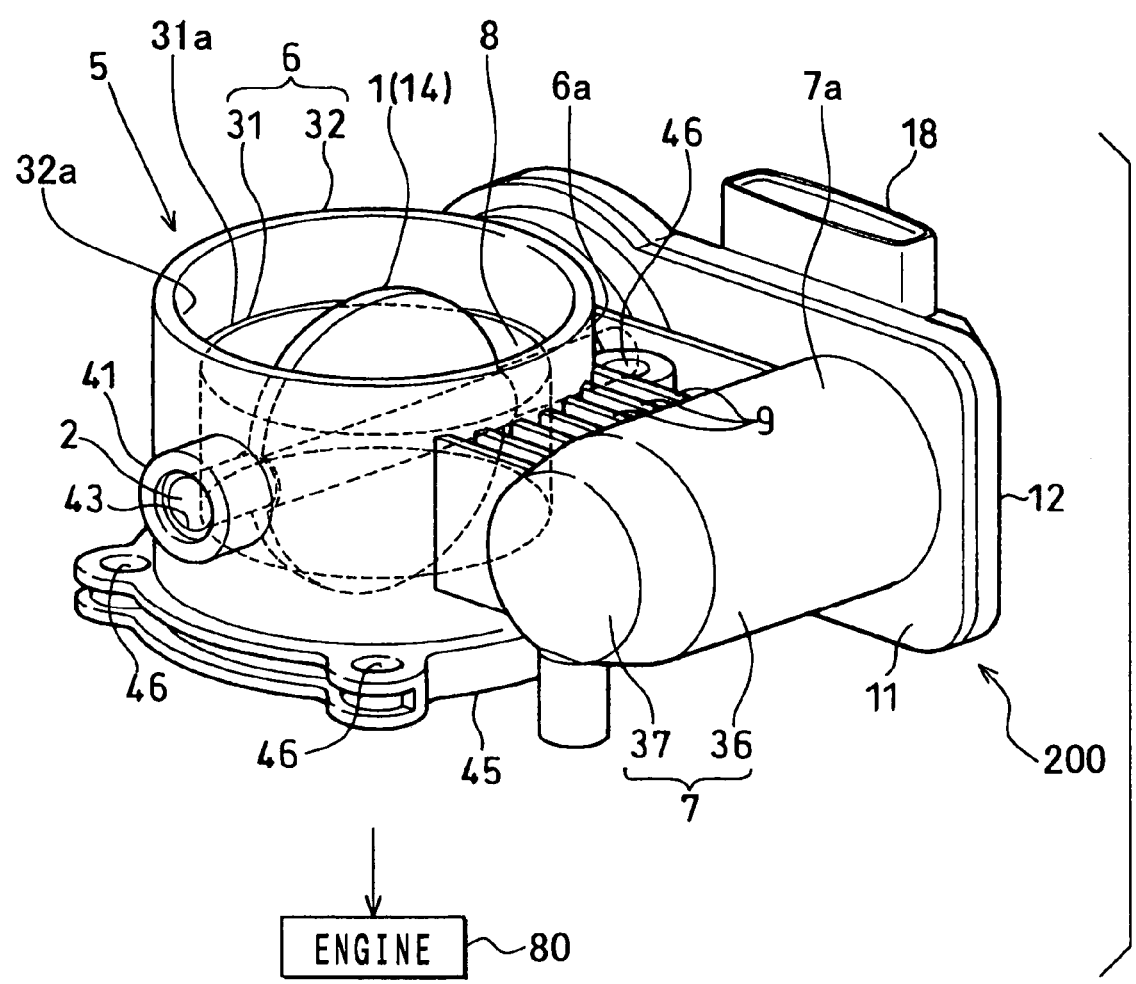
FIG. 1 is a perspective view showing an electrically controlled throttle apparatus according to a first embodiment of the present invention.
Figure 2:
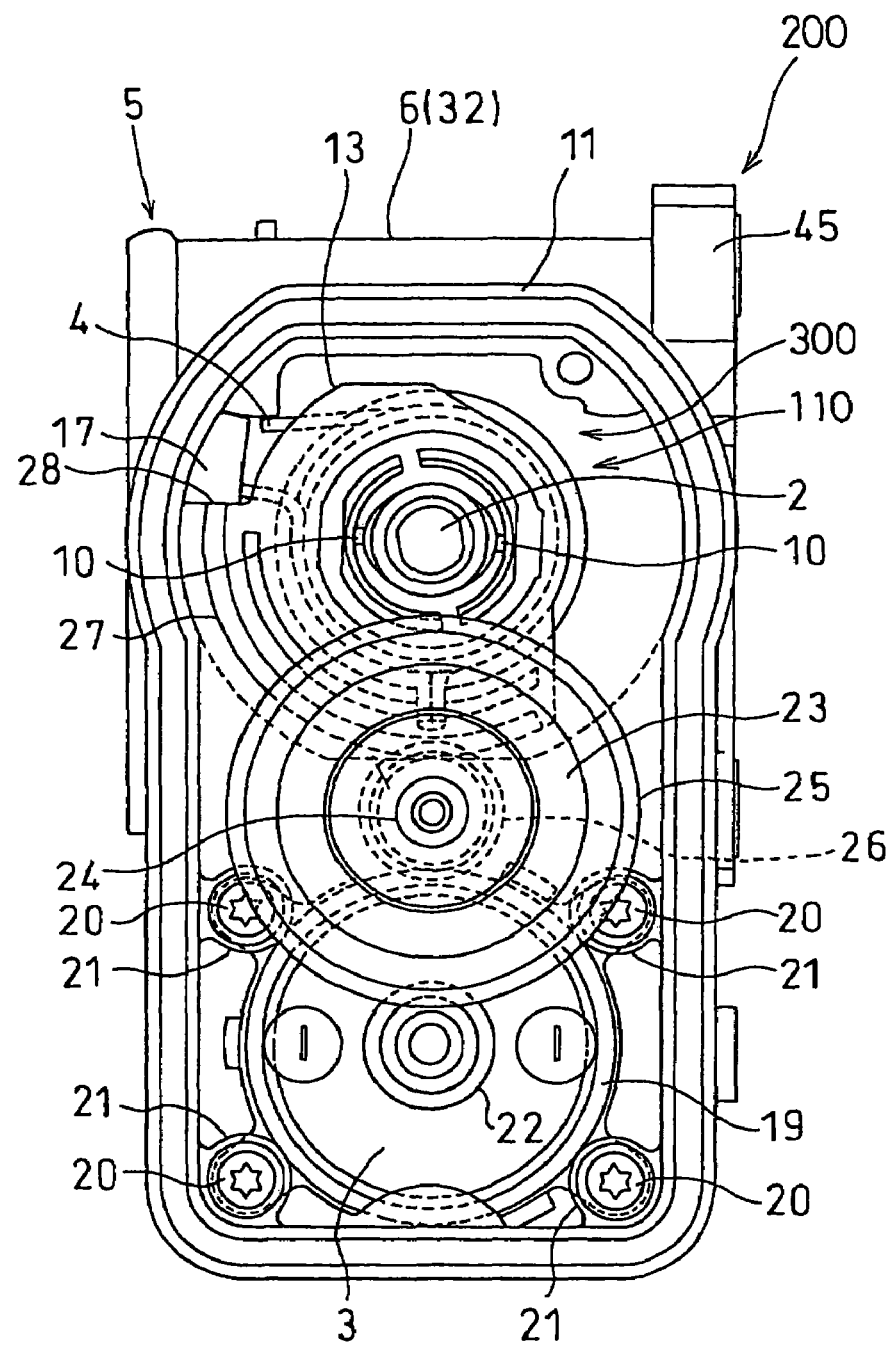
FIG. 2 is a front view showing components received in a gearbox of a throttle body provided in the electrically controlled throttle apparatus.

As shown in FIGS. 1 to 5, an electrically controlled throttle apparatus is constructed with a throttle valve 1, a throttle shaft 2, a driving motor 3, a coil spring 4, reduction gears 300, an actuator case 200, a throttle body 5 and an ECU (electronic control unit). The throttle valve 1 controls an amount of intake air flowing into an internal combustion engine 80. The throttle shaft 2 constructs a shaft part of the throttle valve 1 to be integrally rotated with the throttle valve 1. The driving motor 3 rotates the throttle valve 1 in an open direction, in which the throttle valve 1 is opened to be in a full throttle position (full open position), or a close direction, in which the throttle valve 1 is closed to be in an idling position (full close position). The driving motor 3 serves as an actuator (valve operating means). The coil spring 4 urges the throttle valve 1 in the close direction. The reduction gears (power transmission unit) 300 transmit rotation power of the driving motor 3 to the throttle shaft 2 in order to integrally rotate the throttle shaft 2 and the throttle valve 1. The actuator case 200 rotatably receives the reduction gears 300. The throttle body 5 internally forms an air intake passage introducing intake air into each cylinders of the engine 80. The ECU (electronic control unit) electrically controls the driving motor 3. The ECU is connected to an accelerator position sensor (not shown) that converts an operation degree (accelerator operation amount) of an accelerator pedal stepped by a driver into an electronic signal (accelerator position signal) in order to output the accelerator position signal to the ECU.

The accelerator position signal represents the accelerator operation amount. The electrically controlled throttle apparatus has a throttle position sensor 110 that converts an opening degree of the throttle valve 1 into an electronic signal (throttle position signal) in order to output the throttle position signal to the ECU. The throttle position signal represents an opening degree of the throttle valve 1. The ECU performs PID (proportional, integral and differential [derivative]) feedback control with respect to the driving motor 3 in order to eliminate deviation between the throttle position signal transmitted from the throttle position sensor 110 and the accelerator position signal transmitted from the accelerator position sensor.

The throttle position sensor 110 is constructed with permanent magnets 10, yokes (not shown), a hall element (not shown), a terminal (not shown), a stator (not shown) and the like. The permanent magnets 10 are separated rectangular magnets used for generating a magnetic field. The yokes are constructed with separated substantially arc-shaped pieces, and are magnetized by the permanent magnets 10. The hall element is integrally provided with a sensor cover 12 to be opposed to the separated permanent magnets 10. The terminal is constructed with a conductive metallic thin plate that connects the hall element to the ECU, which is externally provided with respect to the throttle position sensor 110. The stator is made of a ferrous metallic material for concentrating magnetic flux into the hall element. The separated permanent magnets 10 and the separated yokes are secured to the inner periphery of a valve gear 13, which constructs the reduction gears 300, using glue or the like.

The throttle valve 1 is a butterfly-type rotary valve (resinous valve) for controlling an amount of intake air introduced into the engine 80. In this embodiment, the throttle valve 1 having a substantially disc shape is integrally molded with the outer periphery of a valve supporting portion of the throttle shaft 2, so that the throttle valve 1 and the throttle shaft 2 can integrally rotate. The throttle valve 1 is made of a thermo stable resinous material, such as PPS (poly phenylene sulfide), PBTG30 (poly butylene terephthalate including grass fiber by 30%), PA (polyamide), PP (polypropylene) or PEI (polyether imide).

In this embodiment, the throttle valve 1 is constructed with a substantially disc-shaped resinous disc part (disc-shaped part) 14, a substantially cylindrical resinous shaft part (cylindrical part) 15 and the like. A stiffening rib (not shown) is integrally molded on one plane face, e.g., upstream side of the intake airflow direction with respect to the resinous disc part 14, or both plane faces of the disc-shaped part 14 of the throttle valve 1 for reinforcing the disc-shaped part 14. The resinous shaft part 15 is molded of the same resinous material as that of the resinous disc part 14 to be in a substantially cylindrical shape. Both of the axial ends of the resinous shaft part 15 are arranged to be in the substantially same plane as a plane including both ends of the rotation axis of the resinous throttle valve 1, i.e., both circumferential ends around the rotation axis of the throttle valve 1.

The throttle shaft 2 is a metallic shaft (axial reinforce member), which serves as a reinforcing member, formed of a metallic material such as brass or stainless steel to be in a round-bar shape, for example. The axis of the throttle shaft 2 is arranged to be in a direction substantially perpendicular to a central axis of the bore wall part 6 of the throttle body 5, and is arranged to be in a direction substantially parallel to the central axis of a motor housing part 7. In this embodiment, the throttle shaft 2 has a metallic valve supporting portion for supporting the resinous shaft part 15 of the throttle valve 1. The metallic valve supporting portion is insert molded inside of the resinous shaft part 15 to reinforce the resinous disc part 14 and the resinous shaft part 15 of the throttle valve 1.

One end portion of the throttle shaft 2 on the left side end in FIG. 1 exposes (protrudes) from one end face of the resinous shaft part 15 of the throttle valve 1 in order to serve as a first bearing sliding part that rotatably slides with respect to the first valve bearing 41 of the bore wall part 6 of the throttle body 5. The other end side of the throttle shaft 2 on the right side end in FIG. 1 exposes (protrudes) from the other end face of the resinous shaft part 15 of the throttle valve 1 in order to serve as a second bearing sliding part (not shown) that rotatably slides with respect to a second valve bearing (not shown) of the bore wall part 6 of the throttle body 5. The valve gear 13 constructing the reduction gears 300 is integrally provided on the other end portion of the throttle shaft 2 on the right side end in FIG. 1.

The actuator case 200 is constructed with a gearbox part (gear housing part, case body) 11 and a sensor cover (gear cover, cover) 12. The gearbox part 11 is integrally molded of the resinous material with an outer periphery of the bore wall part 6 of the throttle body 5. The sensor cover 12 supports the hall element of the throttle position sensor 110, the terminal and the stator. The sensor cover 12 covers the opening side of the gearbox part 11.

The gearbox part 11 is made of the same resinous material as that of the bore wall part 6, and is molded in a predetermined shape to construct a gear chamber that rotatably receives the reduction gears 300. A full-close stopper 17 is integrally molded with the inner wall of the gearbox part 11 of the resinous material, for restricting rotation of the throttle valve 1 at the idling position, i.e., full close position of the throttle valve 1. Here, a full-open stopper may be integrally molded with the inner wall of the gearbox part 11 for restricting rotation of the throttle valve 1 at the full-throttle position, i.e., full open position of the throttle valve 1.

The sensor cover 12 is formed of a resinous material such as thermo plastic in a predetermined shape, in order to electrically insulate between terminals of the throttle position sensor 110 and power-supply terminals of the driving motor 3. The sensor cover 12 has an engaging part that engages with a corresponding engaged part, which is formed on the opening side of the gearbox part 11 of the throttle body 5, each other. The engaging part of the sensor cover 12 and the engaged part of the gearbox part 11 are connected using a rivet, a screw (not shown), or are thermally swaged with each other, for example. A substantially cylindrical shaped receptacle 18 is integrally molded with the sensor cover 12 to be connected with an electrical connector (not shown).

The driving motor 3 is an electrically driven actuator integrally connected with the power-supply terminals that is provided in the sensor cover 12 or the substantially cylindrical shaped motor housing part 7. When the driving motor 3 is energized, its motor shaft (not shown) is rotated in its forward direction or in its reverse direction. The driving motor 3 has a front-end frame 19 screwed onto a protrusion 21 that is provided in the motor housing part 7 or the gearbox part 11 using a fastening member 20 such as a screw. Thus, the driving motor 3 is received in the motor housing part 7. A cushion member such as a blade spring can be provided between a rear-end frame of the driving motor 3 and a bottom wall surface of the motor housing part 7 in order to insulate the driving motor 3 from vibration of the engine 80. Another cushion member can be provided between an end yoke (not shown) of the driving motor 3 and a bottom wall surface of the motor housing part 7. Alternatively, an insulation member can be provided instead of the cushion member for enhancing vibration resistant performance of the driving motor 3.

The reduction gears 300 reduce rotation speed of the driving motor 3 by a predetermined reduction gear ratio. The reduction gears 300 (valve driving means, power transmission unit) is constructed with a pinion gear 22, a middle reduction gear 23 and the valve gear 13 for driving the throttle shaft 2 that rotates the throttle valve 1. The pinion gear 22 is secured to the outer periphery of the motor shaft of the driving motor 3. The middle reduction gear 23 engages with the pinion gear 22 to be rotated by the pinion gear 22. The valve gear 13 engages with the middle reduction gear 23 to be rotated by the middle reduction gear 23.

The pinion gear 22 is made of a metallic material, and is integrally formed with the motor shaft of the driving motor 3 to be in a predetermined shape, so that the pinion gear 22 serves as a motor gear that integrally rotates with the motor shaft of the driving motor 3. The middle reduction gear 23 is formed to be in a predetermined shape of a resinous material, and is rotatably provided onto the outer periphery of the supporting shaft 24 that serves as a rotation center of the middle reduction gear 23. The middle reduction gear 23 is constructed with a large gear part 25, which engages with the pinion gear 22 of the motor shaft, and a small gear part 26 that engages with the valve gear 13. The supporting shaft 24 is integrally molded with the bottom wall of the gearbox part 11 of the throttle body 5. An end part of the supporting shaft 24 engages with a recess portion formed in the inner wall of the sensor cover 12.

The valve gear 13 is integrally molded to be in a predetermined substantially cylindrical shape of a resinous material. Gear teeth (teeth part) 27 are integrally formed in the outer periphery of the valve gear 13 to engage with the small gear part 26 of the middle reduction gear 23. A cylindrical part (not shown) is integrally molded with the valve gear 13 on the side of the bore wall part 6 to protrude in the left direction in FIG. 1. The outer periphery of the cylindrical part (spring inner periphery guide) of the valve gear 13 supports the diametrically inner periphery of the coil spring 4. A full-close stopper portion 28 is integrally formed with the valve gear 13 on one end plane in the outer circumferential periphery of the valve gear 13, i.e., the gear teeth 27. The full-close stopper portion 28 hooks to the full-close stopper 17 of the gearbox part 11, when the throttle valve 1 is in the idling position, i.e., full close position.

The coil spring 4 is provided on the outer peripheral side of the throttle shaft 2. One end part of the coil spring 4 on the left side in FIG. 1 is supported by a body side hook (not shown) provided on the outer wall 6a of the bore wall part 6 of the throttle body 5, i.e., bottom wall of the gearbox part 11. The other end part of the coil spring 4 on the right side in FIG. 1 is supported by a gear side hook (not shown) provided on a plane of the valve gear 13 that is located on the side of the bore wall part 6.

The throttle body 5 is a throttle housing that includes the substantially cylindrical-shaped bore wall part 6 internally forming a circular-shaped intake passage, through which intake air flows into the engine 80. The bore wall part 6 internally receives the disc-shaped throttle valve 1, such that the throttle valve 1 can open and close the circular-shaped intake passage of the bore wall part 6. The bore wall part 6 rotatably receives the throttle valve 1 in the intake passage (bore), such that the throttle valve 1 can rotate from the full close position to the full open position. The throttle body 5 is screwed onto an intake manifold of the engine 80 using a fasting bolt or a screw (not shown).

Figure 3:
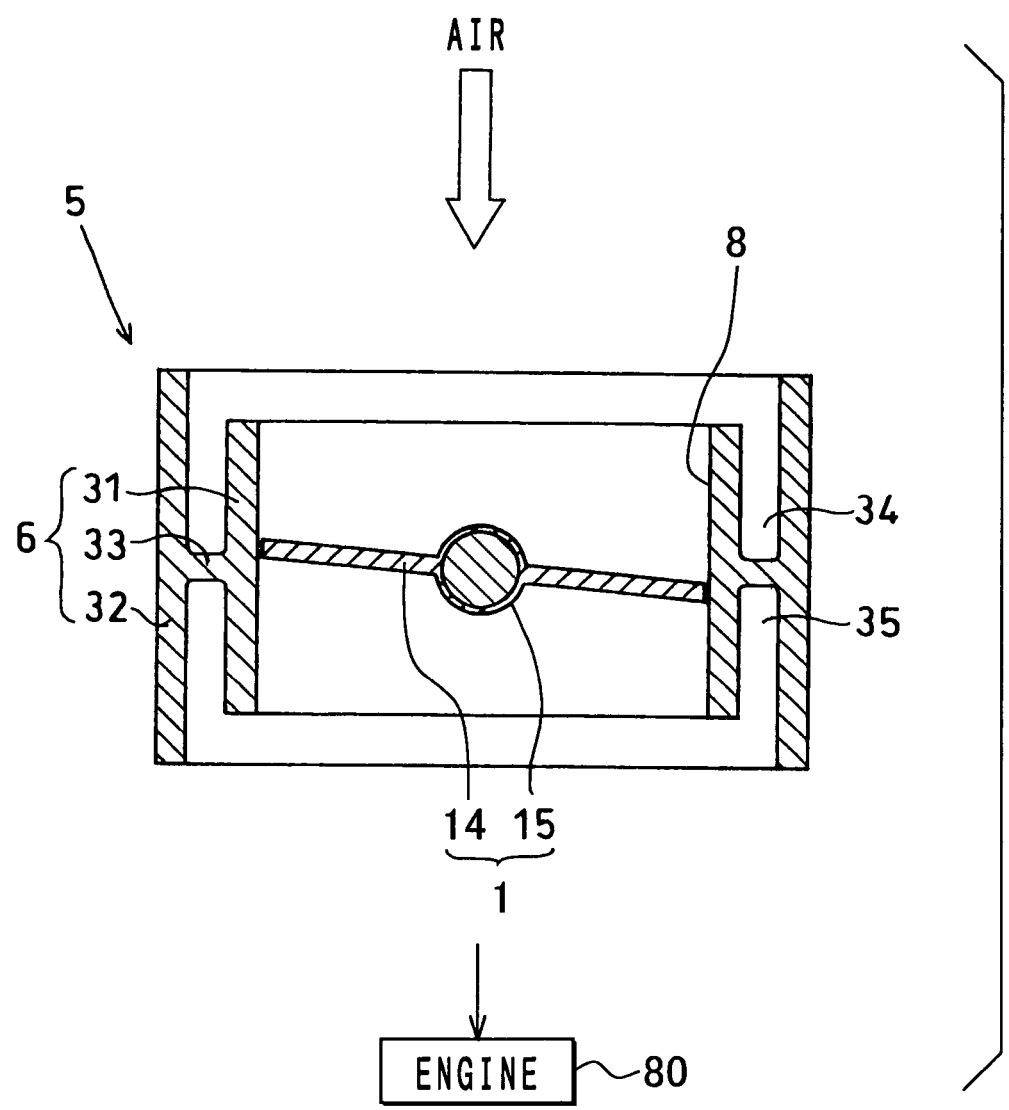
FIG. 3 is a schematic cross-sectional side view showing a double-pipe structure of a bore wall part provided in the throttle body.
Figure 4:
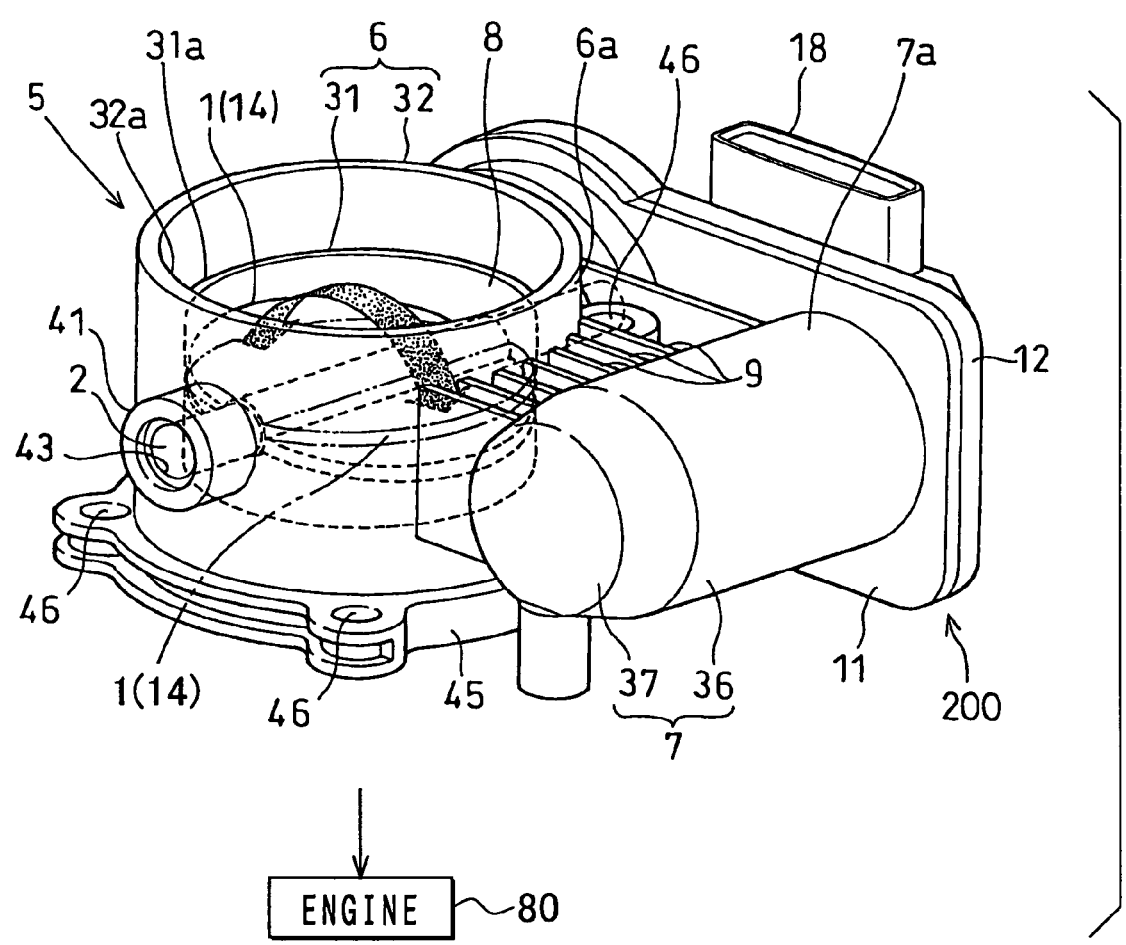
FIG. 4 is a perspective view showing an electrically controlled throttle apparatus including a throttle valve and a bore wall part according to the first embodiment.

As shown in FIG. 3, the bore wall part 6 of the throttle body 5 is formed in a predetermined shape that has a double-pipe structure, in which a substantially cylindrical-shaped bore outer pipe 32 is arranged on the diametrically outer side of a substantially cylindrical-shaped bore inner pipe 31. The bore inner pipe 31 is an internal side cylindrical part that forms an internal periphery. The bore outer pipe 32 is an external side cylindrical part that forms an outer member. The bore wall part 6 of the throttle body 5 is made of a thermo stable resinous material, such as PPS, PBTG30, PA, PP or PEI. The bore inner pipe 31 and the bore outer pipe 32 have an intake-air inlet part (air intake passage) and an intake-air outlet part (air intake passage). Intake air drawn from an air cleaner (not shown) passes through an intake pipe (not shown), the intake-air inlet part and the intake-air outlet part of the bore wall part 6. Subsequently, the intake air flows into a surge tank of the engine 80 or the intake manifold. The bore inner pipe 31 and the bore outer pipe 32 are integrally molded with each other. The bore inner pipe 31 and the bore outer pipe 32 have a substantially the same inner diameter and a substantially the same outer diameter along with the intake airflow direction, i.e., the direction from the upper side to the lower side in the vertical direction of FIG. 1.

The motor housing part 7, which receives the driving motor 3, is integrally molded of the resinous material with the bore wall part 6 via plural plate-shaped connecting members 9 to construct the throttle body 5. The motor housing part 7 is arranged in parallel with the bore wall part 6. That is, the motor housing part 7 is in parallel with the bore wall part 6 with respect to the gearbox part 11 in the throttle body 5. The motor housing part 7 is arranged on the radially outer side of the sidewall face 6a of the bore outer pipe 32 of the bore wall part 6 having the double-pipe structure, with respect to the central axial direction of the bore wall part 6. The motor housing part 7 is integrally molded of the resinous material with the gearbox part 11. Specifically, the motor housing part 7 is integrally molded with the end face of the gearbox part 11 located on the left side in FIG. 1. The gearbox part 11 has a chamber for rotatably receiving the reduction gears 300. The motor housing part 7 has a substantially cylindrical sidewall part 41 and a substantially circular shaped bottom wall part 42. The sidewall part 41 extends from the left side face of the gearbox part 11 in the left direction in FIG. 1. The bottom wall part 42 plugs the opening side of the sidewall part 41 on the left side in FIG. 1. The central axis of the sidewall part 41 of the motor housing part 7 is arranged substantially in parallel with the axis of the throttle shaft 2, i.e., rotation axis of the throttle valve 1. Besides, the central axis of the sidewall part 41 of the motor housing part 7 is arranged substantially perpendicularly to the central axis of the bore inner pipe 31 of the bore wall part 6.

The plural plate-shaped connecting members 9, which have a rib structure, are integrally molded of the resinous material with the bore outer pipe 32 of the bore wall part 6 and the motor housing part 7. The plural plate-shaped connecting members 9 protrude from the sidewall face 6a of the bore outer pipe 32 of the bore wall part 6, and connect to the sidewall face 7a of the sidewall part 36 of the motor housing part 7.

The bore inner pipe 31 internally has an air intake passage, through which intake air flows to the engine 80. The throttle valve 1 and the throttle shaft 2 are rotatably provided in the air intake passage of the bore inner pipe 31. A cylindrical space (annular space) is formed between the bore inner pipe 31 and the bore outer pipe 32, and the cylindrical space is circumferentially blocked, i.e., partitioned, by an annular connecting part 33 at a substantially longitudinally central section thereof. For instance, the substantially longitudinally central section of the cylindrical space is a section along with a circumferential direction of the throttle valve 1 in the full close position. Namely, the substantially longitudinally central section is a circumferential section of the bore wall part 6 passing through the axial center of the throttle shaft 2. The annular connecting part 33 connects the outer periphery 31a of the bore inner pipe 31 and the inner periphery 32a of the bore outer pipe 32, such that the annular connecting part 33 blocks substantially entirely over the circumferential area of the cylindrical space formed between the bore inner pipe 31 and the bore outer pipe 32.

The cylindrical space between the bore inner pipe 31 and the bore outer pipe 32 located on the axially upstream side with respect to the annular connecting part 33 serves as a blockade recess part (moisture trapping groove) 34 for blocking moisture flowing along with the inner periphery of the intake pipe toward the intake manifold. The cylindrical space between the bore inner pipe 31 and the bore outer pipe 32 located on the axially downstream side with respect to the annular connecting part 33 serves as a blockade recess part (moisture trapping groove) 35 for blocking moisture flowing along with the inner periphery of the intake manifold.

Referring back to FIG. 1, the bore inner pipe 31 and the bore outer pipe 32 has the substantially cylindrical first valve bearing 41 and the substantially cylindrical second valve bearing (not shown) that are integrally molded of a resinous material. The first valve bearing 41 rotatably supports the first bearing sliding part of the throttle shaft 2. The second valve bearing rotatably supports the second bearing sliding part of the throttle shaft 2. A circular-shaped first shaft hole 43 is formed in the first valve bearing 41, and a circular-shaped second shaft hole (not shown) is formed in the second valve bearing. A plug (not shown) is provided on the first valve bearing 41 for plugging the opening side of the first valve bearing 41. The second valve bearing is integrally molded with the outer wall 6a of the bore wall part 6, i.e., bottom wall of the gearbox part 11 of the throttle body 5, to be protruded in the right direction in FIG. 1. The outer periphery of the second valve bearing serves as a spring inner periphery guide (not shown) for supporting the diametrically inner periphery of the coil spring 4. A stay part 45 is integrally molded of the resinous material on the outer periphery, i.e., outer wall 6a of the bore outer pipe 32. The stay part 45 is connected with a connecting end face of the intake manifold of the engine 80 using a fastening member such as a bolt (not shown), when the throttle body 5 is mounted on the engine 80. The stay part 45 is provided on the outer wall 6a of the bore outer pipe 32 located on the lower end side in FIG. 1. The stay part 45 radially outwardly protrudes from the surface of the outer wall 6a of the bore outer pipe 32, and has an insertion hole 46 through which the fastening member such as the bolt passes.

As follows, a forming process of the electrically controlled throttle apparatus is described referring to FIGS. 1 to 5 and FIG. 21.

Figure 21:
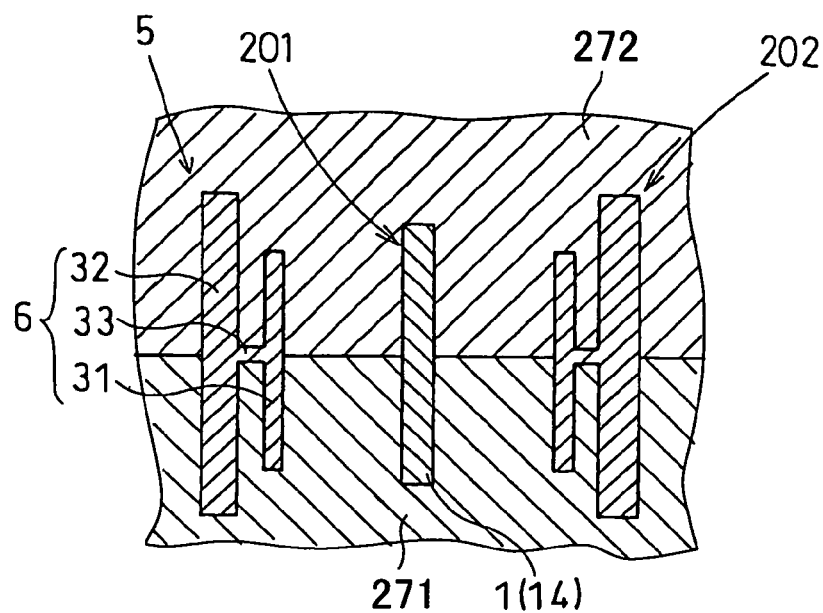
FIG. 21 is a schematic cross-sectional side view showing dies and cavity for forming the throttle valve and the throttle body according to an embodiment of the present invention.

As shown in FIG. 21, the molding dies include a fixed die 271 and a movable die 272 that form cavities 201, 202 corresponding to the throttle valve 1 and the throttle body 5. In detail, the cavity 201 is a valve cavity 201 for molding the throttle valve 1, and the cavity 202 is a body cavity 202 for molding the throttle body 5. In the first embodiment, the cavities 201, 202 are formed to substantially simultaneously mold the throttle valve 1 and the throttle body 5 using the same molding dies, such that the throttle valve 1 is assembled inside of the throttle body 5 in the molding process. Specifically, the throttle valve 1 is set at a position, in which the throttle valve 1 is rotated by a predetermined rotation angle from its full close position. The predetermined rotation angle is greater than the angle of the throttle valve 1 corresponding to its full close position. That is, the throttle valve 1 is rotated by a rotation angle (valve forming angle θ) to be set at a position excluding its full close position in the molding process thereof.

Figure 5A:
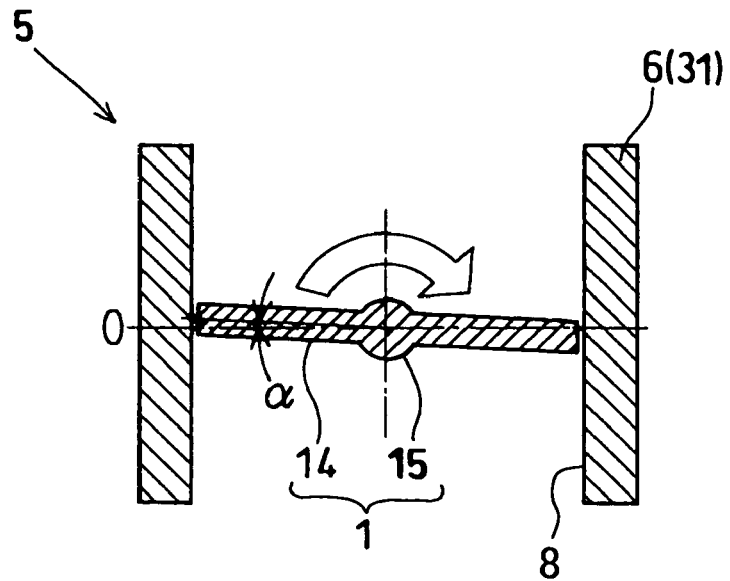
FIGS. 5A and 5B are schematic cross-sectional side views showing a rotation range of a throttle valve received in the bore wall part in a forming process thereof.
Figure 5B:
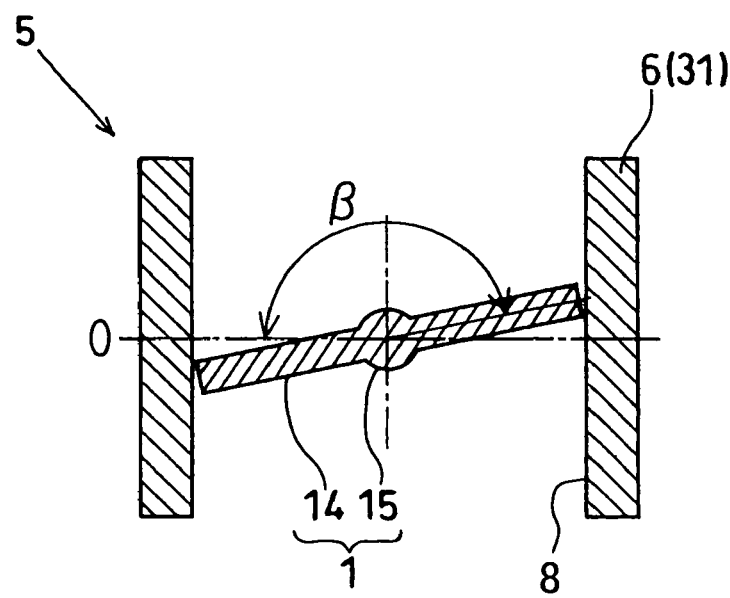

As shown in FIGS. 5A and 5B, the throttle valve 1 is molded of a resinous material in the same molding dies as that of the throttle body 5. In this situation, a rotation angle (valve forming angle θ) of the throttle valve 1 is set between a rotation angle α ($\geq 0°$) corresponding to the full close position of the throttle valve 1 and a rotation angle β ($\leq 180°$) corresponding to a position of the throttle valve 1 in which the throttle valve 1 contacts the throttle body 5. The relation among α, β and θ is shown by the following equation (1).

$$\alpha < \theta < \beta \qquad (1)$$

Thus, the outer circumferential periphery of the throttle valve 1 and the bore inner periphery 8 of the bore inner pipe 31 can be substantially entirely partitioned using the fixed die 271 and the movable die 272 of the molding dies. Here, one outer circumferential periphery of the throttle valve 1 around its rotation center (rotation axis) and a portion of the bore inner periphery 8 of the bore inner pipe 31, which is located in the vicinity of the first bearing 41, are connected via the throttle shaft (metallic shaft) 2. Besides, the other outer circumferential periphery of the throttle valve 1 around its rotation center and another portion of the bore inner periphery 8 that is located in the vicinity of the second bearing are also connected via the throttle shaft (metallic shaft) 2.

Heated thermo plastic (filler), i.e., thermo stable plastic such as PPS or PBT in a molten state is injected into the cavities 201, 202 formed in the molding dies constructed with the fixed die 271 and the movable die 272. The filler is injected into the cavities 201, 202 through at least one gate formed in the molding dies, so that the cavities 201, 202 formed in the molding dies are filled with the filler (molten resinous material), in an injection-filling process. In this situation, the throttle shaft (metallic shaft) 2 is set in the predetermined position in the cavities 201, 202.

Subsequently, pressure applied to the filler in the molding dies is gradually increased, and the increased pressure is maintained at a pressure greater than the maximum pressure applied to the injected filler in the injection-filling process. That is, predetermined pressure greater than injection pressure is applied to the filler (molten resinous material) filled in the molding dies. Subsequently, cooling water is introduced into the molding dies. In this situation, the filler contracts (shrinks) in the molding dies due to the cooling process. Therefore, additional filler is injected into the cavities 201, 202 through at least one gate formed in the molding dies to refill additional filler by an amount equivalent to a reduced volume of the molded filler due to the contraction caused in the cooling process, in a pressure holding process. The gate can be formed in the molding dies in at least one of the cavities molding the bore inner pipe 31, the side of the bore outer pipe 32 and/or the side of the motor housing part 7.

Subsequently, the filler filled in the cavities 201, 202 of the molding dies is taken out, and is cooled to be solidified.

Alternatively, the filler filled in the cavities 201, 202 of the molding dies is cooled to be solidified using cooling water or the like, while the filler is received in the cavities 201, 202. Thus, the throttle body 5 including the bore wall part 6 having a double pipe structure, which rotatably receives the throttle valve 1 and the throttle shaft 2, can be simultaneously molded. The throttle shaft 2 is insert molded in the resinous shaft part 15 of the throttle valve 1.

As follows, an operation of the electrically controlled throttle apparatus is described. When the driver steps the accelerator pedal of the vehicle, the accelerator position signal, which is transmitted from the accelerator position sensor to the ECU, changes. The ECU controls electric power supplied to the driving motor 3, so that the motor shaft of the driving motor 3 is rotated and the throttle valve 1 is operated to be in a predetermined position. The torque of the driving motor 3 is transmitted to the valve gear 13 via the pinion gear 22 and the middle reduction gear 23. Thus, the valve gear 13 rotates by a rotation angle corresponding to the stepping degree of the accelerator pedal, against urging force generated by the coil spring 4.

Therefore, the valve gear 13 rotates, and the throttle shaft 2 also rotates by the same angle as the rotation angle of the valve gear 13, so that the throttle valve 1 rotates from its full close position toward its full open position in the open direction. As a result, the air intake passage formed in the bore inner pipe 31 of the bore wall part 6 of the throttle body 5 is opened by a predetermined degree, so that rotation speed of the engine 80 is changed to be a rotation speed corresponding to the stepping degree of the accelerator pedal by the driver.

By contrast, when the driver releases the accelerator pedal, the throttle valve 1, the throttle shaft 2, the valve gear 13 and the like return to an initial position of the throttle valve 1 by urging force of the coil spring 4. The initial position of the throttle valve 1 is an idling position or the full close position. When the driver releases the accelerator pedal, the value of the accelerator position signal transmitted by the accelerator position sensor becomes substantially 0%. Therefore, in this situation, the ECU can supply electric power to the driving motor 3 in order to rotate the motor shaft of the driving motor 3 in its reverse direction, so that the throttle valve 1 is controlled at its full close position. In this case, the throttle valve 1 can be rotated in the close direction by the driving motor 3.

The throttle valve 1 rotates in the close direction by urging force of the coil spring 4 until the full-close stopper portion 28 provided on the valve gear 13 contacts the full-close stopper 17 integrally molded on the inner wall of the gearbox part 11 of the throttle body 5. Here, the close direction is a direction, in which the throttle valve 1 closes the air intake passage by rotating from the full open position to the full close position. Rotation of the throttle valve 1 is restricted by the full-close stopper 17 at the full close position of the throttle valve 1. Therefore, the throttle valve 1 is maintained in the predetermined full close position, i.e., idling position, in the air intake passage formed in the bore inner pipe 31 of the bore wall part 6 of the throttle body 5. Thus, the air intake passage connected to the engine 80 is substantially closed, so that rotation speed of the engine 80 is set at a predetermined idling speed.

The throttle valve 1 is molded of a resinous material, such that the throttle valve 1 is rotatably assembled in the throttle body 5 while the throttle valve 1 is set to be in the predetermined throttle position, in the electrically controlled throttle apparatus. Specifically, the throttle valve 1 is rotated by a predetermined rotation angle from its full close position. The predetermined rotation angle is greater than the angle of the throttle valve 1 corresponding to its full close position. That is, the throttle valve 1 is rotated by a rotation angle to be set at a position excluding its full close position in the molding process thereof. Thus, a predetermined gap can be obtained between the bore inner periphery 8 of the throttle body 5 and the outer circumferential periphery of the throttle valve 1 by the molding dies.

Figure 22:
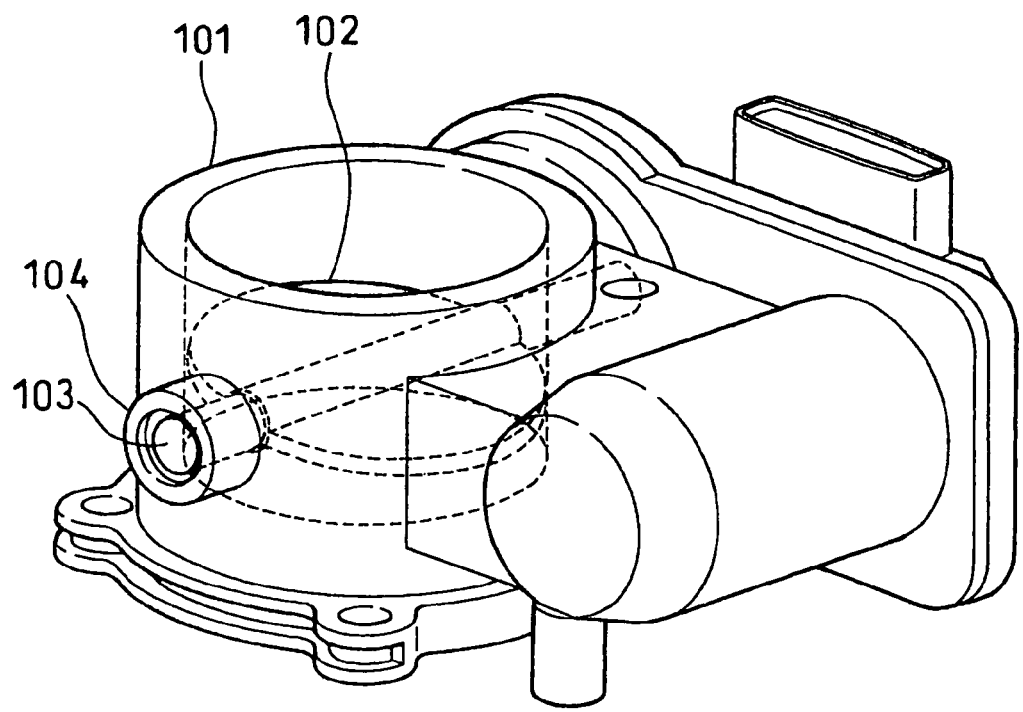
FIGS. 22, 23 are perspective views showing an electrically controlled throttle apparatus according to a prior art.
Figure 23:
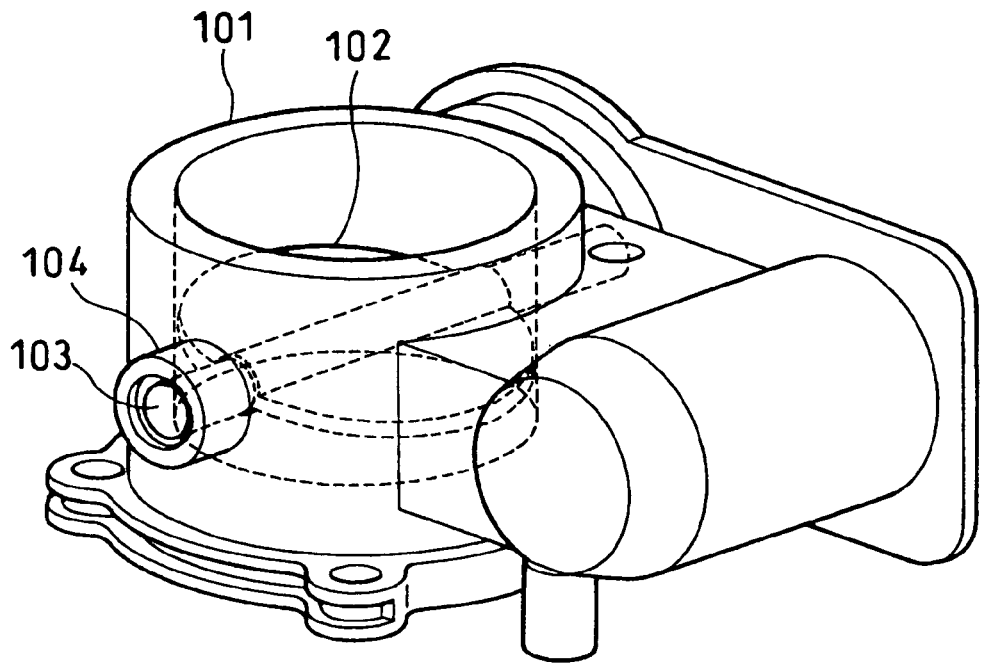
Figure 24:
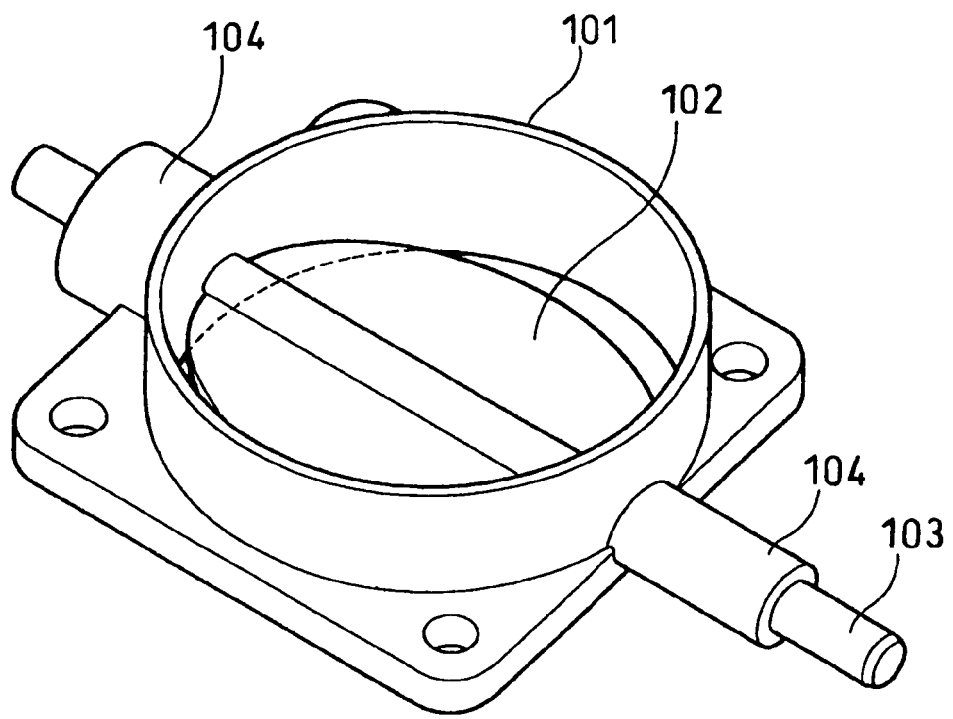
FIG. 24 is a perspective view showing a throttle valve received in a throttle body according to a prior art.
Figure 25A:
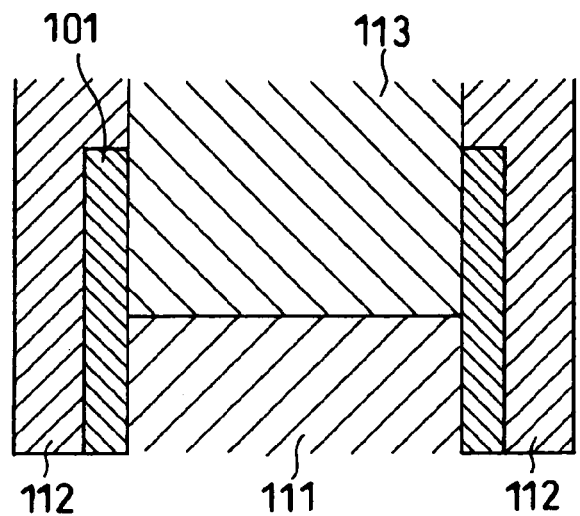
FIGS. 25A to 25C are schematic cross-sectional side views showing a forming process of a throttle valve in a throttle body according to a prior art.
Figure 25B:
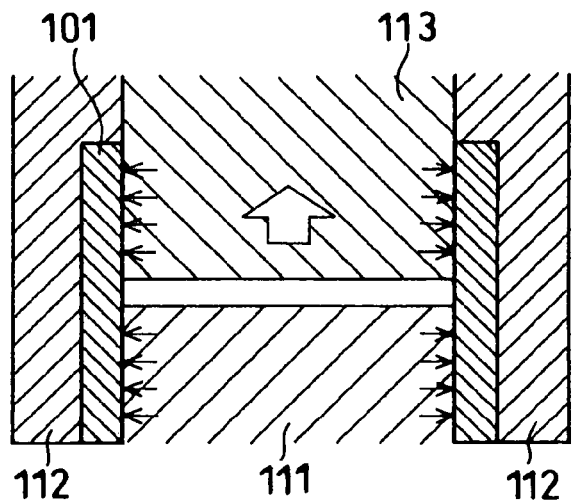
Figure 25C:
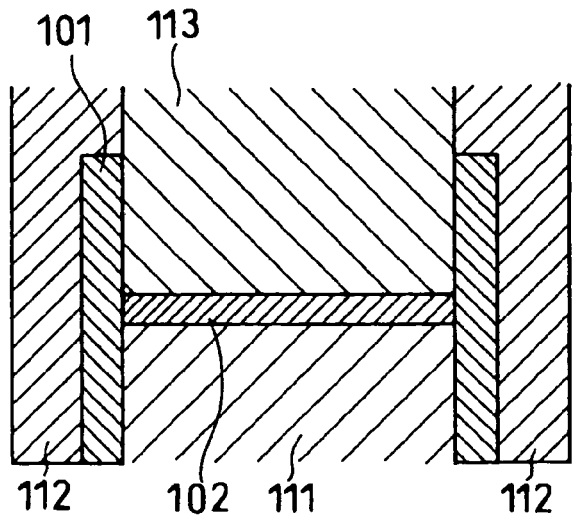

Conventionally, the throttle body 101 and the throttle valve 102 shown in FIGS. 22 and 23 are independently manufactured in each different processes. Subsequently, a manufactured throttle valve 102 is combined with a manufactured throttle body 101 in a downstream process. However, when the forming process in this embodiment is used, such combining process can be reduced. Besides, according to the conventional processes in JP-A-5-141540 and JP-B2-3315135, a sequential process is needed to mold the throttle body 101 and the throttle valve 102. Specifically, the throttle body 101 is molded in the first process, and the throttle valve 102 is molded in the second process in the same molding dies. In the second process, the inner periphery of the throttle body 101 is used as a molding die for shaping the throttle valve 102. However, when the forming process in this embodiment is used, such sequential process can be reduced. Thus, molding process and manufacturing process can be largely reduced. Besides, cost needed for manufacturing the dies can be largely reduced, because dies for individually forming the throttle valve and throttle body can be integrated into reduced number of dies. Therefore, the present molding method can produce a cheaper electrically controlled throttle apparatus.

The throttle shaft (metallic shaft) 2 is insert molded in the resinous shaft part 15 of the throttle valve 1 when the resinous shaft part 15 and the bore inner pipe 31 are simultaneously molded. Therefore, the throttle valve 1 and the bore inner pipe 31 are completely divided at both ends of the throttle shaft 2, i.e., the first bearing sliding part and the second bearing sliding part, in which the resinous shaft part 15 and the bore inner pipe 31 are connected with each other via the throttle shaft (metallic shaft) 2. Specifically, the throttle shaft 2 is formed of a material, which is not adhesive to a material formed to be the throttle body 5 and the resinous shaft part 15. That is, the material of the throttle shaft 2 and the material of both the throttle body 5 and the resinous shaft part 15 do not weld to be joined with each other. Namely, the material of the throttle shaft 2 and the material of both the throttle body 5 and the resinous shaft part 15 do not have compatibility with each other. Therefore, the throttle body 5 and the resinous shaft part 15 can be partitioned by the molding dies and separated (separated) from each other by the throttle shaft (molding member) 2. Accordingly, the throttle valve and the throttle body can be restricted from welding to each other, dissimilarly to the conventional molding process. Thus, the throttle valve 1 and the throttle body 5 can be simultaneously molded in the same molding dies.

Additionally, the gap, which is formed between the cylindrical inner periphery 8 of the bore inner pipe 31 of the throttle body 5 and the outer circumferential periphery of the throttle valve 1, can be maintained in a predetermined dimension using the molding dies. Thus, interference between the outer circumferential periphery of the throttle valve 1 and the bore inner periphery 8 of the bore inner pipe 31 of the bore wall part 6 can be restricted over a rotation range (rotation angle range) of the throttle valve 1 from its full close position to its full open position. Therefore, the throttle apparatus including the throttle valve 1 can be restricted from occurrence of malfunction. Besides, airtightness can be maintained when the throttle valve 1 is in the full close position, and leakage of intake air in the idling operation of the vehicle can be decreased. The amount of fuel, for instance gasoline, consumed in the engine 80 is controlled in accordance with a flow amount of intake air. Accordingly, reduction of the leakage of intake air in the idling operation contributes to improvement of fuel efficiency of the vehicle.

The molded throttle valve 1 and the molded throttle body 5 are arranged to be apart from each other by predetermined axial gaps. Specifically, a predetermined gap is formed among the bore inner periphery 8 of the bore inner pipe 31, the resinous disc part 14 of the throttle valve 1, and the resinous shaft part 15 of the throttle valve 1. In detail, a predetermined gap is formed in the axial direction of the throttle shaft 2 between a portion of the bore inner periphery 8 located around the first valve bearing 41 (i.e., the first shaft hole 43) and the resinous disc part 14 that are opposed with each other. Besides, a predetermined gap is formed in the axial direction of the throttle shaft 2 between a portion of the bore inner periphery 8 located around the first valve bearing 41 and one axial end of the resinous shaft part 15 located on the left side in FIG. 1 that are opposed with each other. A predetermined gap is formed in the axial direction of the throttle shaft 2 between a portion of the bore inner periphery 8 located around the second valve bearing (i.e., the second shaft hole) and the resinous disc part 14 that are opposed with each other. Besides, a predetermined gap is formed in the axial direction of the throttle shaft 2 between a portion of the bore inner periphery 8 located around the second valve bearing (i.e., the second shaft hole) and the other axial end of the resinous shaft part 15 located on the right side in FIG. 1 that are opposed with each other.

The throttle shaft (metallic shaft) 2, which is insert molded in the resinous shaft part 15, is rotatably supported at the first bearing sliding part and the second bearing sliding part thereof by the first valve bearing 41 and the second valve bearing, respectively. The throttle valve 1 and the throttle shaft 2 are integrally rotated. Interference between the outer circumferential periphery of the throttle valve 1 and the bore inner periphery 8 of the bore inner pipe 31 of the bore wall part 6 can be restricted over a rotation range (rotation angle range) of the throttle valve 1 from its full close position to its full open position. Thus, the throttle valve 1 and the throttle shaft 2 can rotate in the bore inner periphery 8 of the bore inner pipe 31 of the bore wall part 6.

Second Embodiment

Figure 6:
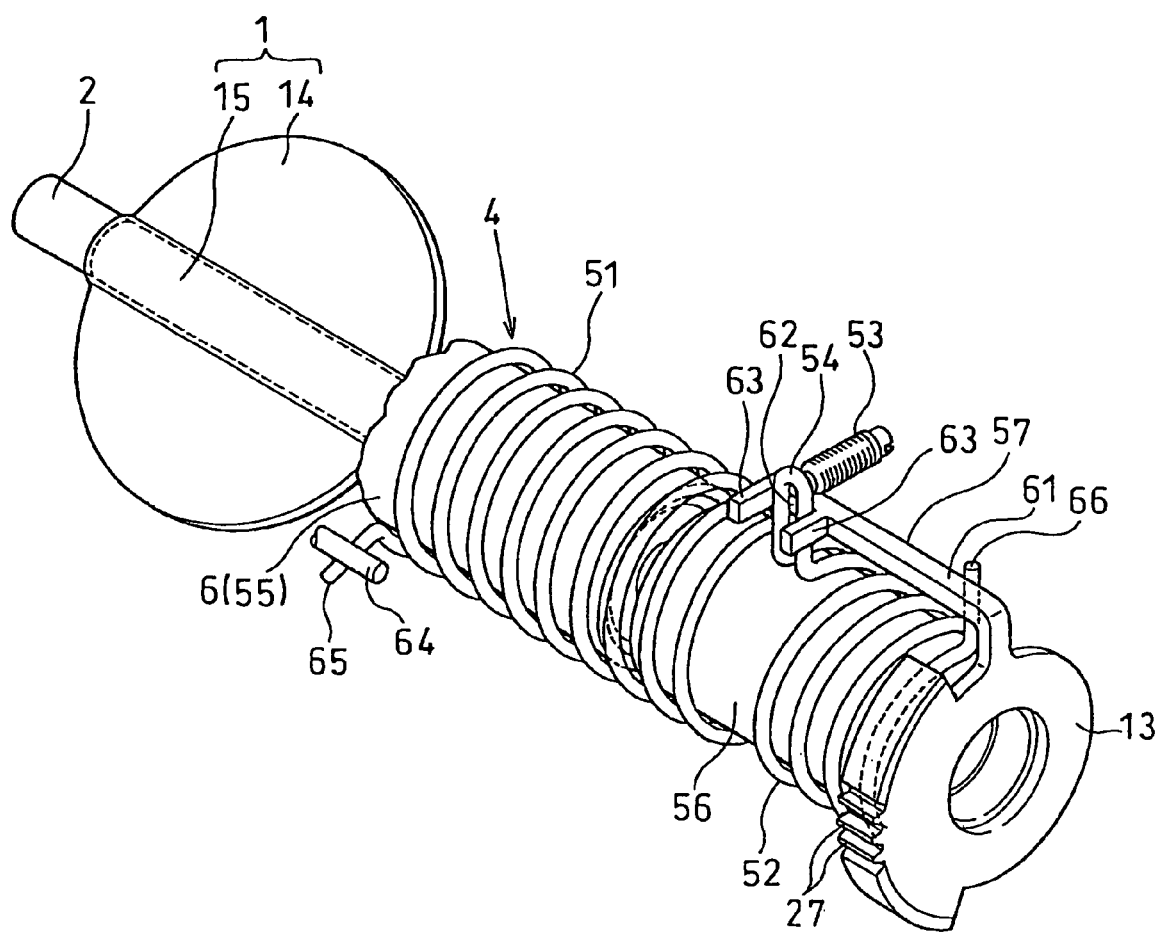
FIG. 6 is a perspective view showing an inner mechanism of the electrically controlled throttle apparatus according to a second embodiment of the present invention.

As shown in FIG. 6, the electrically controlled throttle apparatus in the second embodiment has a coil spring 4 constructed with a first spring part (return spring) 51 and a second spring part (default spring) 52. The return spring 51 serves as a returner spring and the default spring 52 serves as an opener spring. The return spring 51 and the default spring 52 are integrated into one coil spring (valve forcing means) 4 that urges a throttle valve 1 in the close direction and in the open direction of the throttle valve 1. The coil spring 4 is arranged between the outer wall 6a of the bore wall part 6, i.e., bottom wall of the gearbox part 11 and a plane of the valve gear 13 that is located on the side of the bore wall part 6. A connecting member between the return spring 51 and the default spring 52 is bent to be in a substantially U-shape to serve as a U-shaped hook part 54 supported by a middle stopper member 53. Both sides of the coil spring 4 are wound in different directions from each other. That is, the return spring 51 is wound in one direction, and the default spring 52 is wound in the opposite direction with respect to the winding direction of the return spring 51.

A boss-shaped middle position stopper (not shown) is provided in the gearbox part 11 of the throttle body 5, such that the middle position stopper internally protrudes in the gearbox part 11. A middle stopper member 53 (adjust screw) is screwed into the middle position stopper for mechanically maintaining the throttle valve 1 at a predetermined middle position using urging force of the return spring 51 and urging force of the default spring 52 when power supplied to the driving motor 3 is terminated. The urging force of the return spring 51 and the urging force of the default spring 52 are applied in different directions from each other. The predetermined middle position of the throttle valve 1 is a position between the full close position and the full open position. A cylindrical spring inner periphery guide 55 is integrally formed with the outer wall 6a of the bore wall part 6, i.e., bottom wall of the gearbox part 11 of the throttle body 5, to be protruded in the right direction in FIG. 6. The outer periphery of the spring inner periphery guide 55 supports the diametrically inner periphery of the coil spring 4. Another cylindrical spring inner periphery guide 56 is integrally formed with the plane of the valve gear 13 that is located on the side of the bore wall part 6. The cylindrical spring inner periphery guide 56 protrudes in the left direction in FIG. 6. The outer periphery of the spring inner periphery guide 56 supports the diametrically inner periphery of the coil spring 4.

An opener member 57 is integrally molded of a resinous material with the valve gear 13 in this embodiment. The opener member 57 is located on the side of the bore wall part 6 with respect to the valve gear 13, and is urged by the default spring 52 from the full close position toward the middle position in the open direction. A gear-side hook (second hooking part) 61, a hooking part 62 and slip restricting guides 63 are integrally formed with the opener member 57.

The gear-side hook 61 hooks to one end of the default spring 52 of the coil spring 4 in the right end in FIG. 6. The hooking part 62 detachably hooks to the U-shaped hook part 54 connecting the return spring 51 and the default spring 52. The slip restricting guides 63 are arranged near the hooking part 62 for restricting movement of the U-shaped hook part 54 in the axial direction of the coil spring 4.

A spring body-side hook (first hooked part) 65 is provided on one end side of the return spring 51 of the coil spring 4, which is located on the side of the bore wall part 6 on the left side in FIG. 6. The spring body-side hook 65 hooks to a body-side hook 64 (first hooking part) that is integrally formed with the outer wall 6a of the bore wall part 6, i.e., bottom wall of the gearbox part 11 of the throttle body 5. A spring gear-side hook (second hooked part) 66 is provided on the side of the default spring 52 of the coil spring 4, which is located on the side of the valve gear 13, i.e., on the right side in FIG. 6. The spring gear-side hook 66 hooks to the gear-side hook (second hooking part) 61 of the opener member 57.

As follows, an operation of the electrically controlled throttle apparatus, when power supplied to the driving motor 3 is terminated, is described. The hooking part 62 of the opener member 57 contacts the U-shaped hook part 54 of the coil spring 4, while the opener member 57 is inserted between the connecting end part of the default spring 52, i.e., the U-shaped hook part 54, and the spring gear-side hook 66.

In this situation, the hooking part 62 and the U-shaped hook part 54 are urged onto each other by urging force of the return spring 51 and urging force of the default spring 52 used as the opener spring. Here, the return spring 51 returns the throttle valve 1 from its full open position to its full close position via the opener member 57. The default spring 52 returns the throttle valve 1 from its full close position to its middle position via the opener member 57. Thus, the throttle valve 1 can be maintained at the middle position, so that a fall back operation, i.e., failsafe operation can be performed when power supplied to the driving motor 3 is terminated.

Third Embodiment

Figure 9:
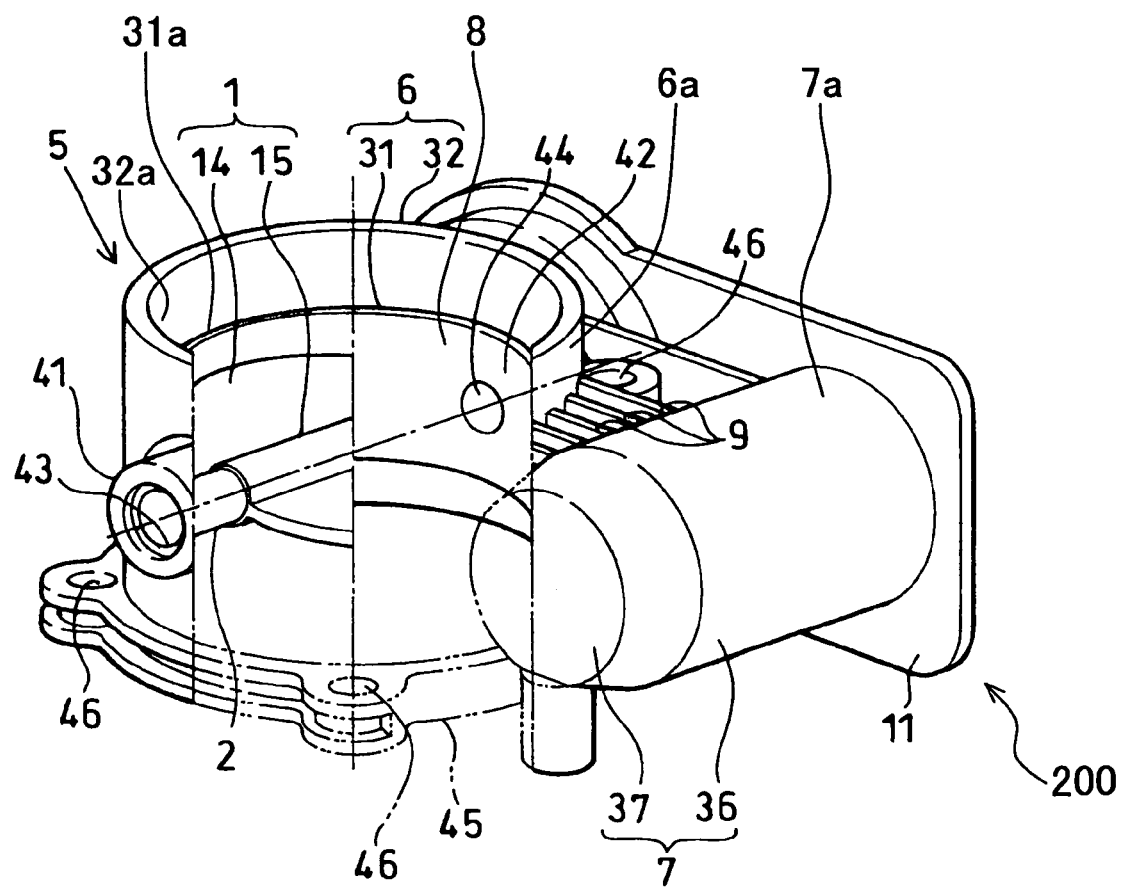
FIG. 9 is a perspective view showing an electrically controlled throttle apparatus according to an example (related art)

In the first example shown in FIG. 9, the throttle valve 1 and the throttle body 5 are simultaneously molded in the same molding dies, such that the throttle valve 1, which is in its full close position, is assembled in the bore wall part 6 of the throttle body 5. The gap, which is formed between the cylindrical inner periphery 8 of the bore inner pipe 31 of the throttle body 5 and the outer circumferential periphery of the throttle valve 1, is maintained in a predetermined dimension using the molding die, so that airtightness property can be obtained when the throttle valve 1 is in its full close position.

Figure 10A:
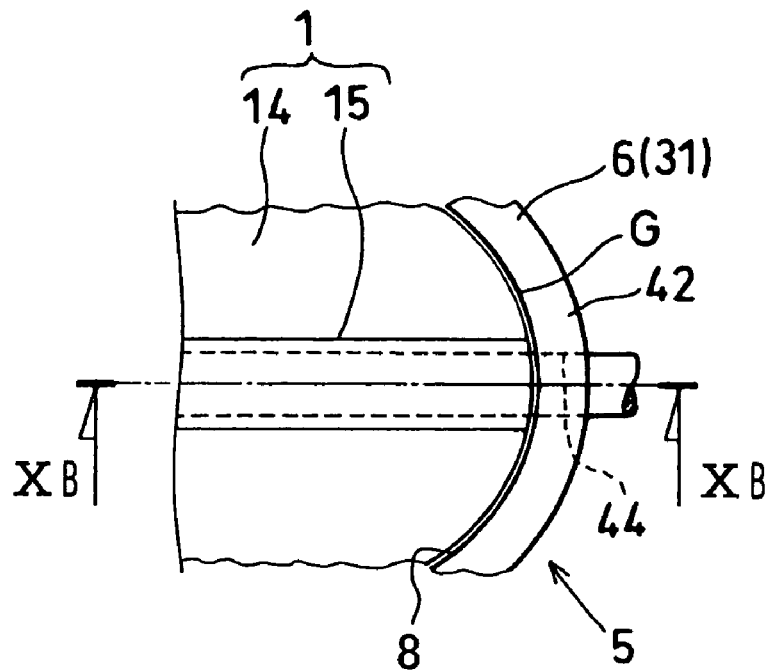
FIG. 10A is a schematic top view showing the bore wall part and the throttle valve.
Figure 10B:
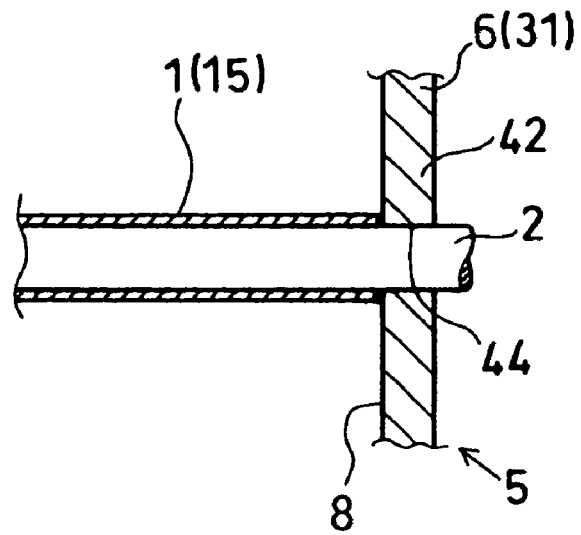
FIG. 10B is a schematic partially cross-sectional front view showing the bore wall part and the throttle valve according to the example (related art)

However, in the first example shown in FIGS. 10A, 10B, a gap, which is formed between the cylindrical inner periphery 8 of the bore inner pipe 31 of the throttle body 5 and the throttle valve 1, has to be formed over the outer circumferential periphery of the throttle valve 1. Therefore, the molding dies need a thin portion over a large area of the outer circumferential periphery of the throttle valve 1 to form a predetermined thin gap (G). Accordingly, cost needed for manufacturing the molding dies largely increases.

Figure 7:
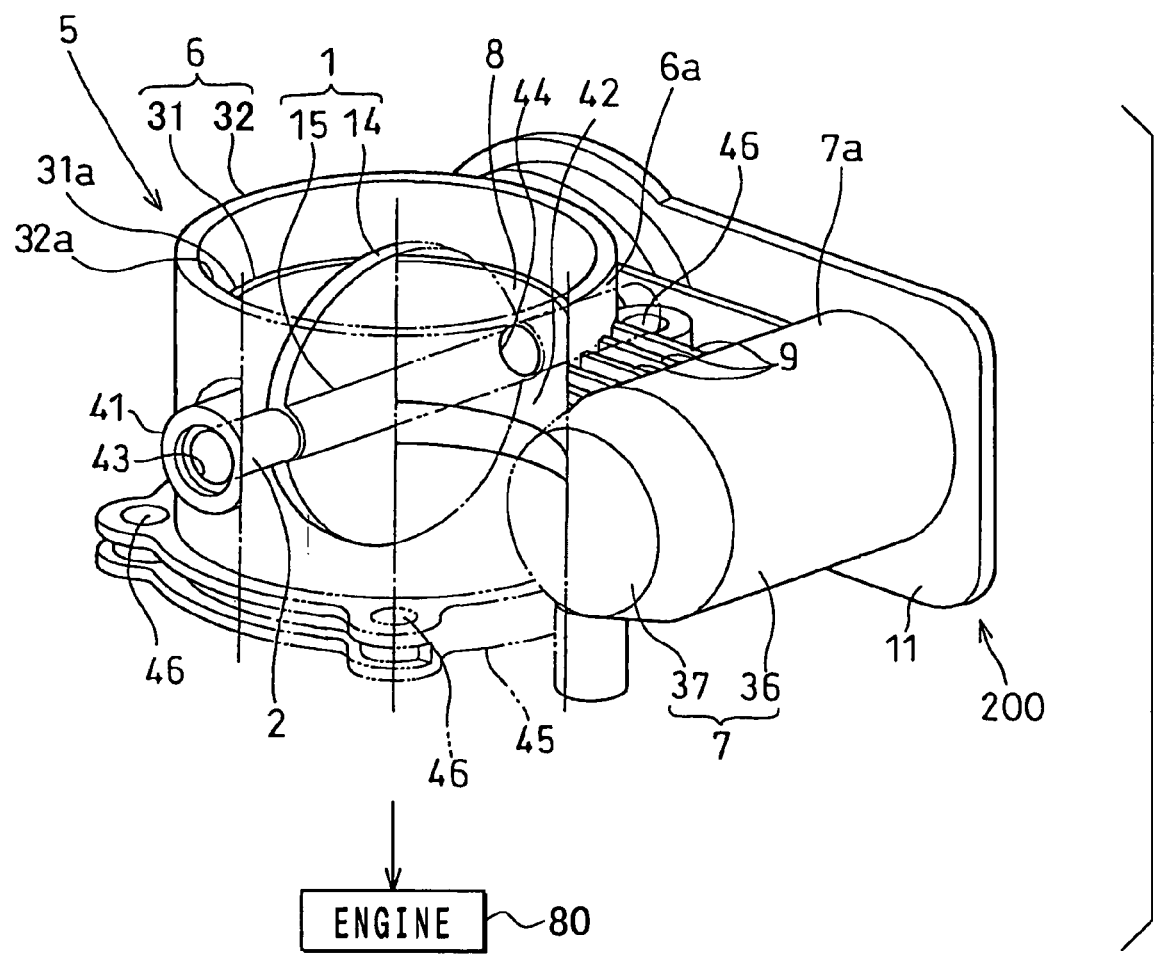
FIG. 7 is a perspective view showing an electrically controlled throttle apparatus according to a third embodiment of the present invention.
Figure 8A:
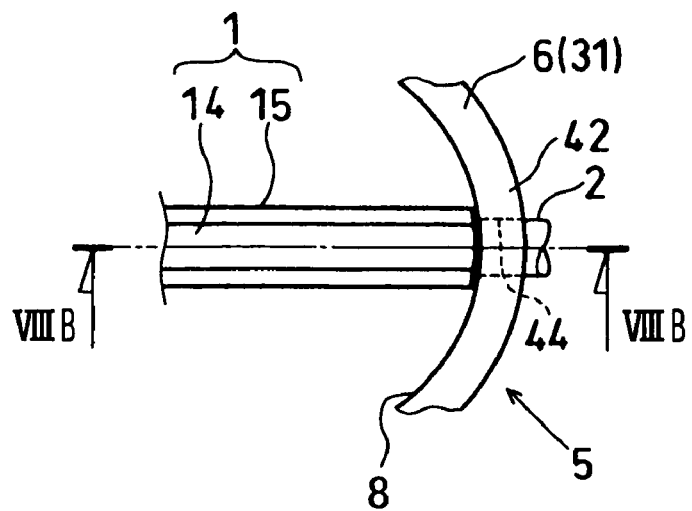
FIG. 8A is a schematic top view showing the bore wall part and the throttle valve.
Figure 8B:
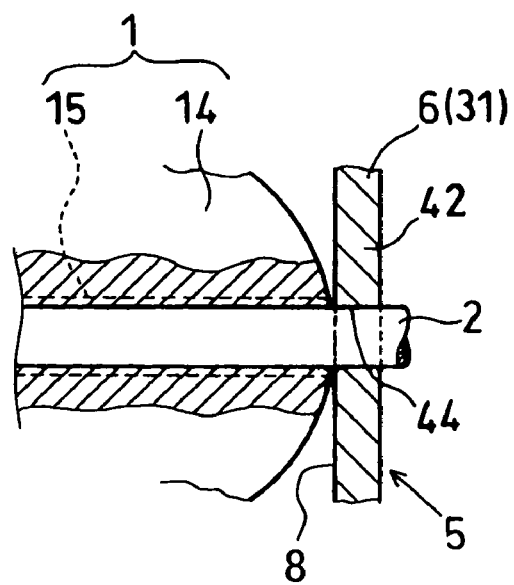
FIG. 8B is a schematic partially cross-sectional front view showing the bore wall part and the throttle valve according to the third embodiment.

In this embodiment, the throttle valve 1 is simultaneously molded in the same molding dies as that of the throttle body 5 to be rotatably assembled in the bore wall part 6 of the throttle body 5. Specifically, as shown in FIGS. 7, 8A and 8B, the throttle valve 1 is formed in the throttle body 5 when the throttle valve 1 is inclined from its full close position by a predetermined angle that is larger than the angle corresponding to the full close position of the throttle valve 1. That is, the throttle valve 1 is formed in the throttle body 5 when the throttle valve 1 is in a position excluding the full close position. For example, the throttle valve is rotated by an angle corresponding to its full open position, i.e., valve forming angle θ=90°. In this situation, a portion of the outer circumferential periphery of the throttle valve 1, which is perpendicular to the rotation axis of the throttle valve 1, becomes substantially parallel to the central axis of the bore inner pipe 31 of the bore wall part 6 of the throttle body 5.

Referring back to the first example, the molding dies need a thin portion over a large area to form a thin gap between the outer circumferential periphery of the throttle valve 1 and the bore inner periphery 8 to partition the throttle valve 1 and the bore inner periphery 8 of the bore inner pipe 31. On the contrary in this embodiment, molding dies need a thin portion in a more limited reduced area compared with the first example.

Thus, one outer circumferential periphery of the throttle valve 1 around its rotation center (rotation axis) and a portion of the bore inner periphery 8 of the bore inner pipe 31, which is located in the vicinity of the first bearing 41, can be partitioned using a thin portion of the molding dies. Besides, another outer circumferential periphery of the throttle valve 1 around its rotation center and another portion of the bore inner pipe 31, which is located in the vicinity of the second bearing, can be also partitioned using a thin portion of the molding dies.

The throttle valve 1 is rotatably assembled inside of the bore inner pipe 31 of the bore wall part 6 of the throttle body 5 in its molding process using the same molding dies. Interference between the outer circumferential periphery of the throttle valve 1 and the bore inner periphery 8 of the bore inner pipe 31 of the bore wall part 6 can be restricted over a rotation range (rotation angle range) of the throttle valve 1 from its full close position to its full open position. Besides, airtightness can be maintained when the throttle valve 1 is in the full close position.

Fourth Embodiment

Figure 11:
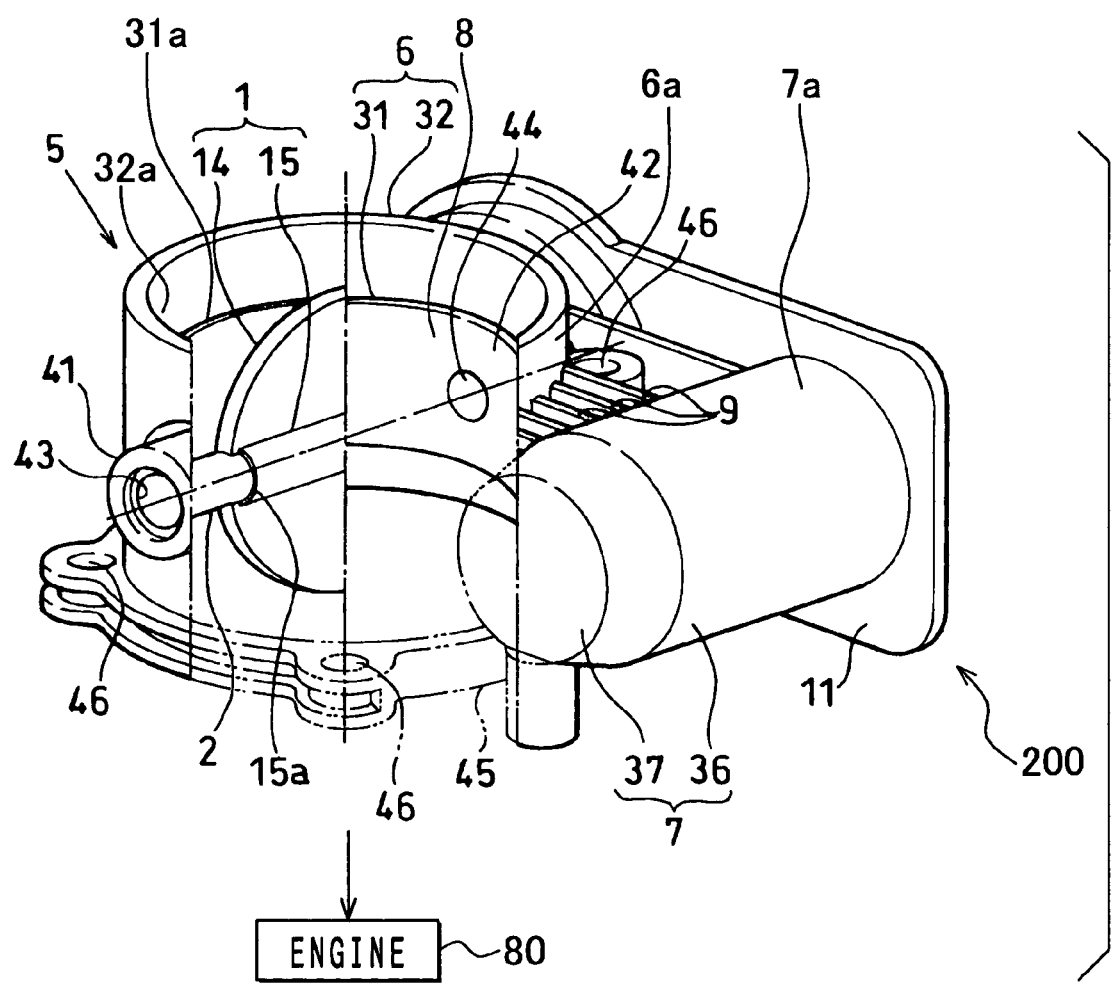
FIG. 11 is a perspective view showing an electrically controlled throttle apparatus according to a fourth embodiment of the present invention.
Figure 12A:
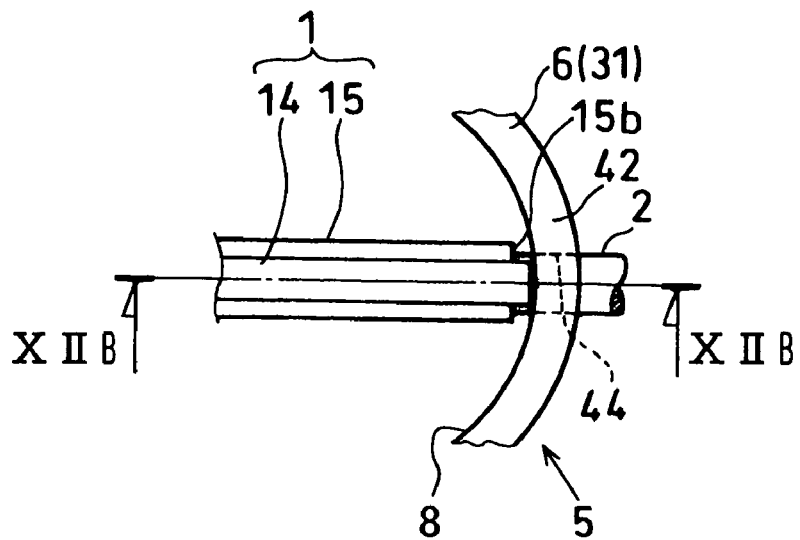
FIG. 12A is a schematic top view showing the bore wall part and the throttle valve.
Figure 12B:
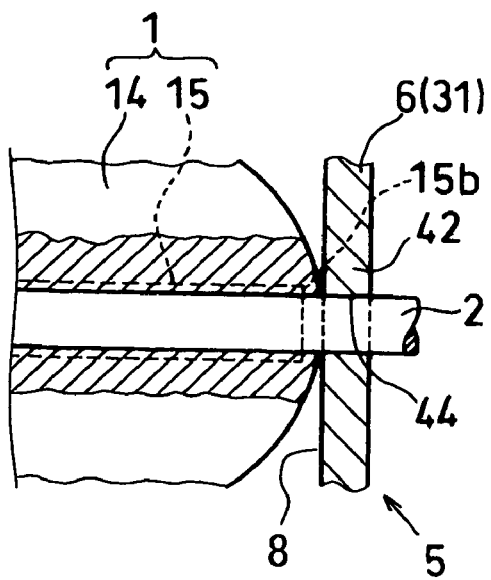
FIG. 12B is a schematic partially cross-sectional front view showing the bore wall part and the throttle valve according to the fourth embodiment.

In the fourth embodiment shown in FIGS. 11, 12A and 12B, both axial ends of the resinous shaft part 15 of the throttle valve 1 are axially recessed from its circular peripheral ends by a predetermined length in order to form a first annular end face 15a and a second annular end face 15b. In this embodiment, molding dies need a thin portion in a more limited reduced area compared with the first to third embodiments, because broader gaps are formed around the first annular end face 15a and the second annular end face 15b between the throttle valve 1 and the bore inner periphery 8 of the bore inner pipe 31. Accordingly, durability of the molding dies can be enhanced.

A resinous shaft can be used as the throttle shaft 2 instead of the metallic shaft used in the first to fourth embodiments. In this case, the resinous shaft part 15 can be integrally molded of a resinous material to construct the throttle valve 1, so that the number of components of the throttle valve 1 can be reduced.

Fifth Embodiment

Figure 13:
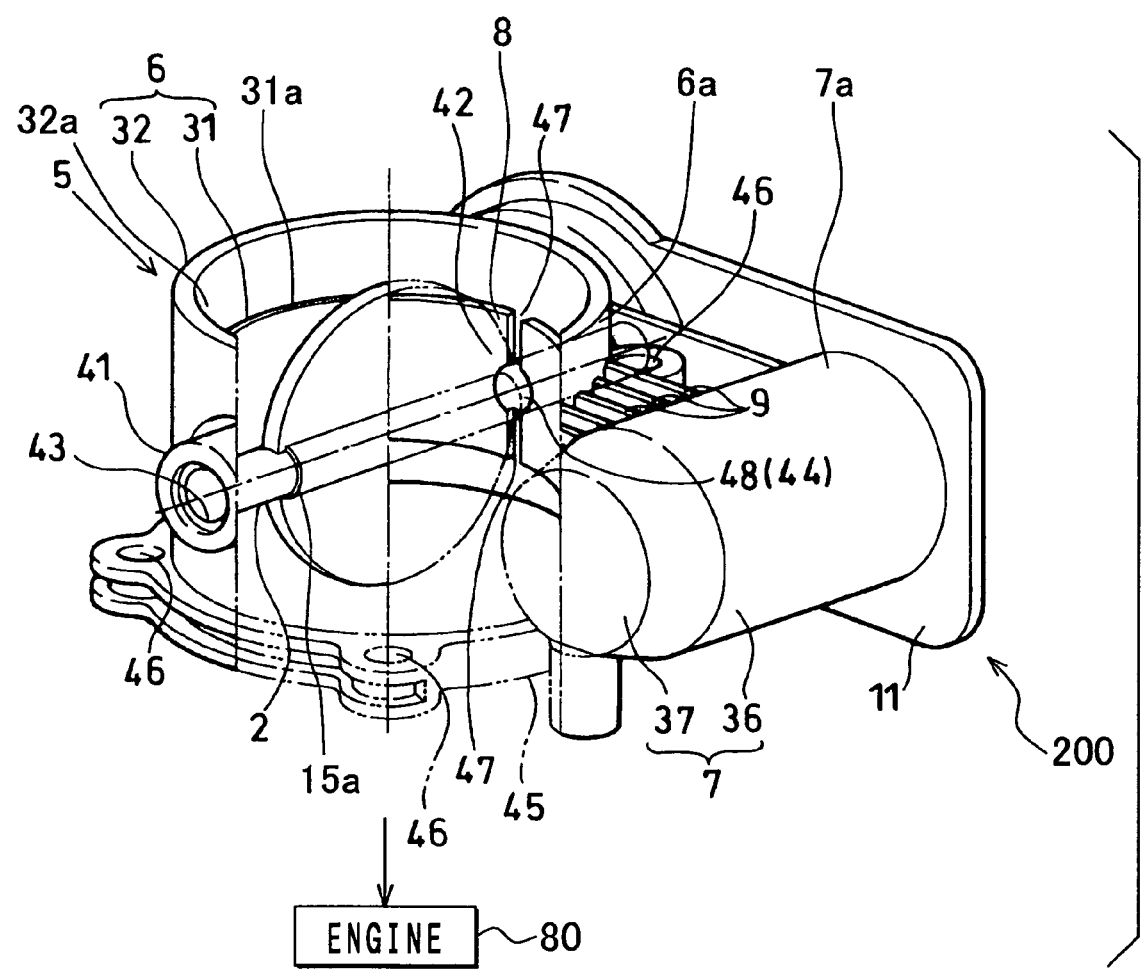
FIG. 13 is a perspective view showing an electrically controlled throttle apparatus according to a fifth embodiment of the present invention.
Figure 14A:
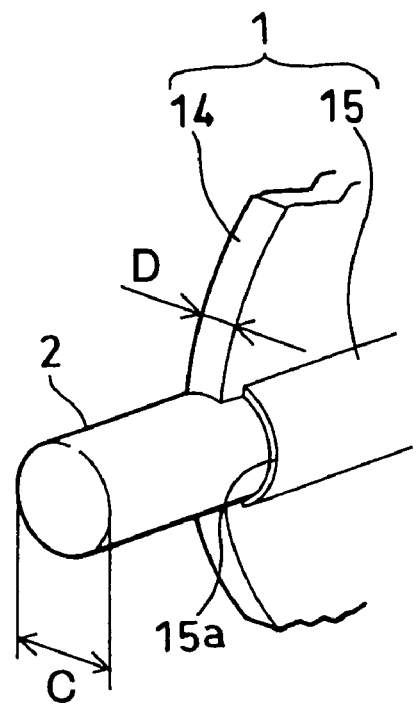
FIG. 14A is a schematic perspective view showing a throttle valve and a throttle shaft.
Figure 14B:
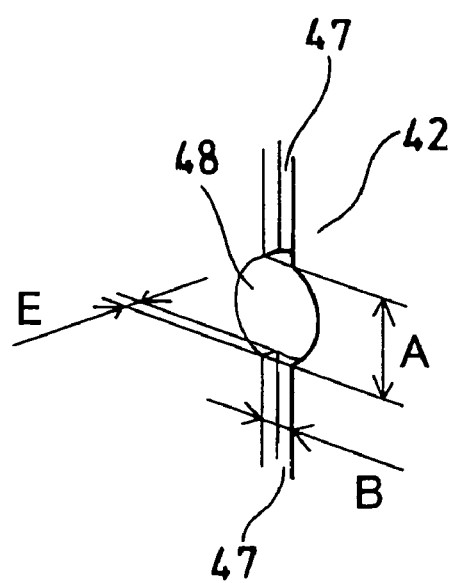
FIG. 14B is a schematic perspective view showing a joint structure according to the fifth embodiment.

In the fifth embodiment shown in FIGS. 13, 14A and 14B, a first slit (not shown) is formed to extend parallel to the central axis of the bore inner pipe 31 of the throttle body 5, in addition to the first and second annular end faces 15a, 15b. The first slit (groove, substantially flat section, substantially linear section) is formed in the vicinity of the first valve bearing 41, i.e., in the vicinity of the first shaft hole 43 in the bore inner periphery 8 of the bore inner pipe 31 of the bore wall part 6 of the throttle body 5. Besides, a second slit 47 is formed to extend parallel to the central axis of the bore inner pipe 31 of the throttle body 5. The second slit 47 is formed in the vicinity of the second valve bearing 42, i.e., in the vicinity of the second shaft hole 44 in the bore inner periphery 8. The first slit and the second slit 47 are integrally formed in the bore inner pipe 31 of the bore wall part 6 to form a body side joint structure.

A substantially circular first shaft hole and a substantially circular second shaft hole 48 are formed in a substantially axially central portion of the bore inner pipe 31. That is, both the first shaft hole and the second shaft hole 48 are formed in a portion of the outer periphery 31a of the bore inner pipe 31, to which the annular connecting part 33 connects. The first shaft hole communicates between a portion of the first slit on the upstream side and a portion of the first slit on the downstream side along intake airflow. The first shaft hole of the bore inner pipe 31 has the same inner diameter as that of the first shaft hole 43 of the first valve bearing 41, and is coaxially arranged with respect to the first shaft hole 43. The second shaft hole 48 communicates between a portion of the second slit 47 on the upstream side and a portion of the second slit 47 on the downstream side along intake airflow. The second shaft hole 48 of the bore inner pipe 31 has the same inner diameter as that of the second shaft hole 44 of the second bearing 42, and is coaxially arranged with respect to the second shaft hole 44.

Here, a dimension A is defined as the inner diameter of both the first shaft hole and the second shaft hole 48 of the bore inner periphery 8 of the bore inner pipe 31 in the axial direction of the bore inner pipe 31. A dimension B is defined as the width of both the first slit and the second slit 47 of the bore inner periphery 8 of the bore inner pipe 31. A dimension C is defined as the outer diameter of the throttle shaft 2. A dimension D is defined as the board thickness of the resinous disk part 14 of the throttle valve 1. A dimension E is defined as the depth of both the first slit and the second slit 47 of the bore inner periphery 8 in the wall thickness direction (radial direction) of the bore inner periphery 8 of the bore inner pipe 31. Relations among the dimensions A to E are described as follows.

$$\text{dimension A} \geq \text{dimension C} \quad (2)$$

$$\text{dimension D} \leq \text{dimension B} \quad (3)$$

$$0 < \text{dimension E} \quad (4)$$

When the joint structure is used, and the dimensions A to E satisfies the relations (2) to (4), the throttle valve 1 and the bore inner pipe 31 of the throttle body 5 can be completely partitioned using the molding dies. Therefore, the throttle valve 1 and the bore wall part 6 of the throttle body 5 can be simultaneously molded in the same molding dies. Besides, a predetermined gap can be formed between the throttle valve 1 and the bore inner periphery 8 of the bore wall part 6 of the throttle body 5 using the molding dies.

Sixth Embodiment

Figure 15:
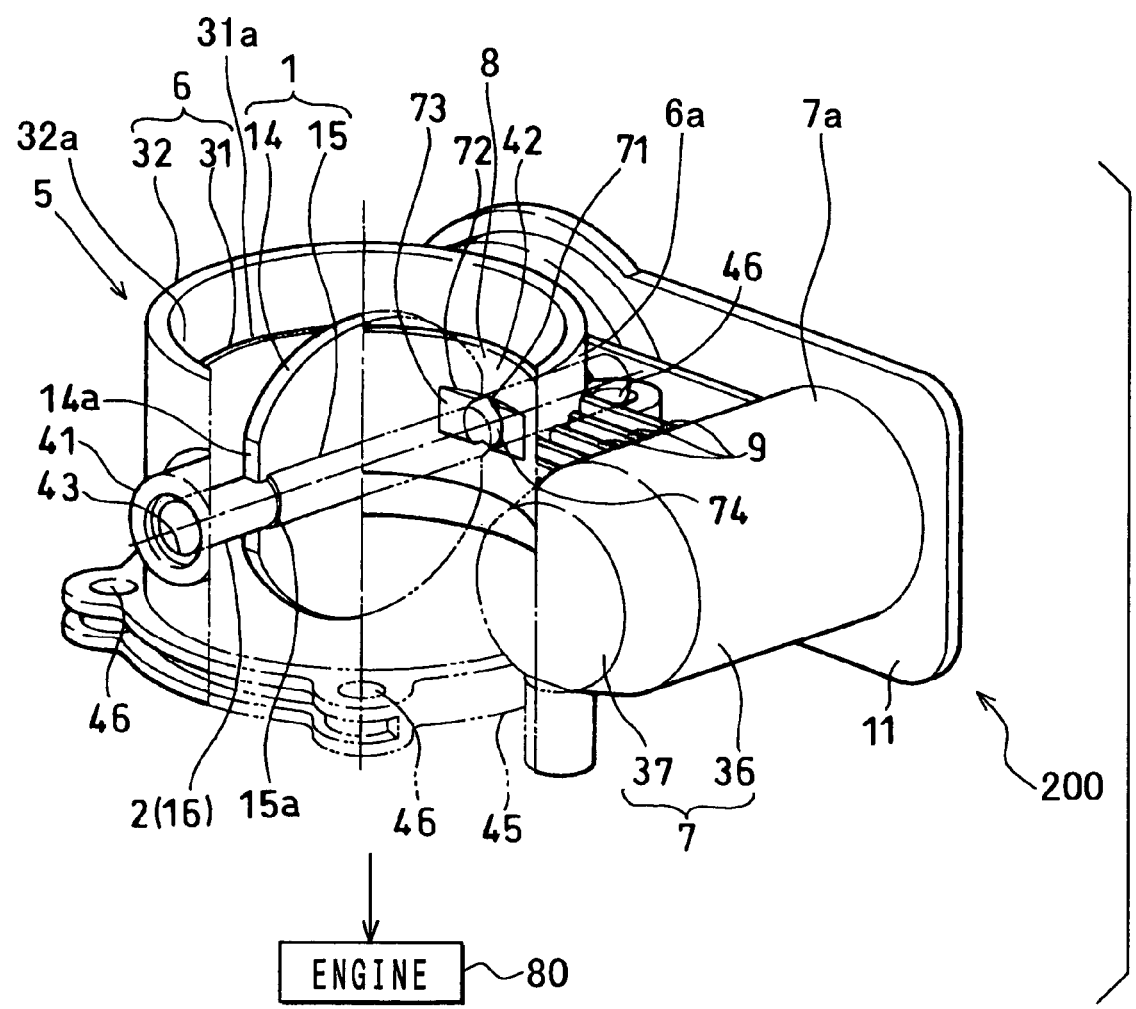
FIG. 15 is a perspective view showing an electrically controlled throttle apparatus according to a sixth embodiment of the present invention.
Figure 16A:
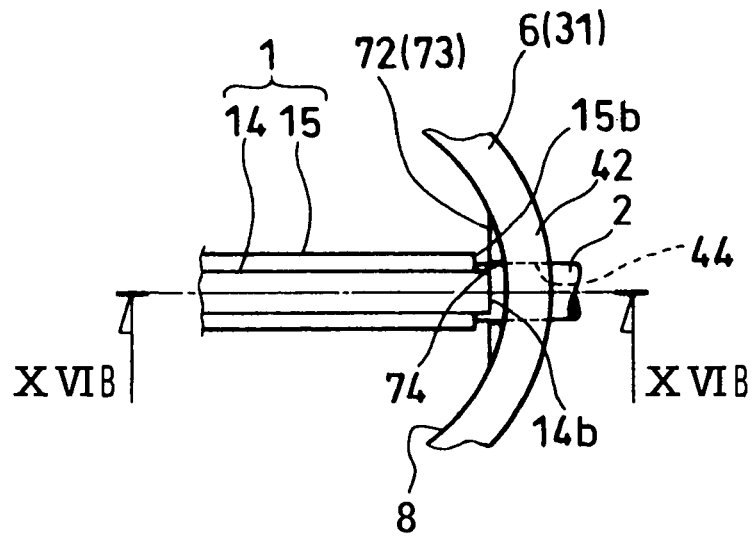
FIG. 16A is a schematic top view showing the bore wall part and the throttle valve.
Figure 16B:
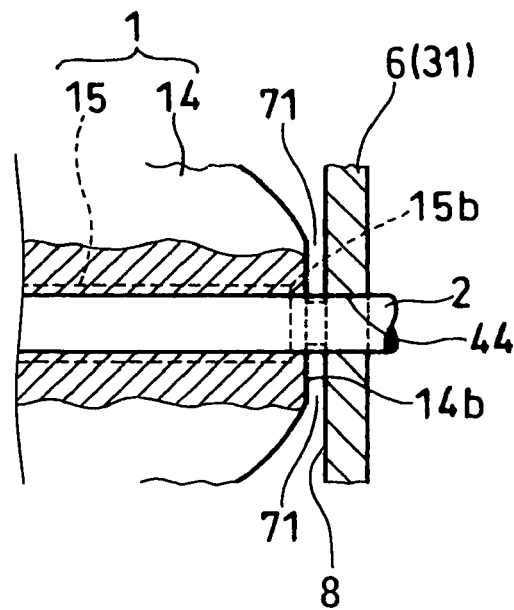
FIG. 16B is a schematic partially cross-sectional front view showing the bore wall part and the throttle valve according to the sixth embodiment.
Figure 17A:
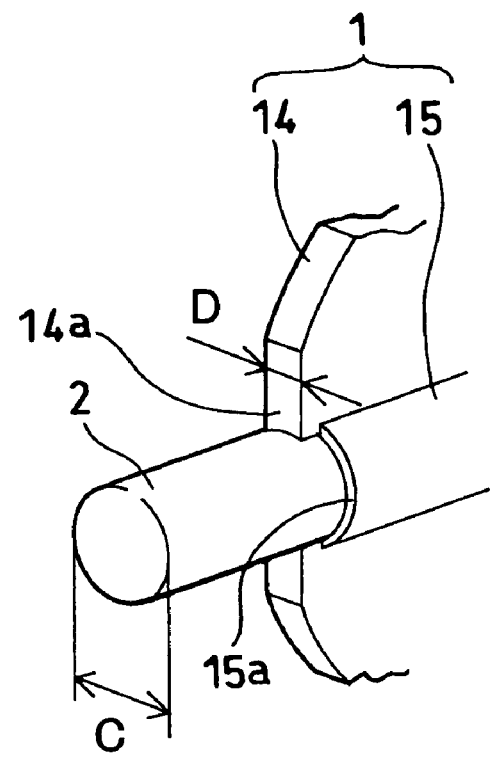
FIG. 17A is a schematic perspective view showing a throttle valve and a throttle shaft.
Figure 17B:
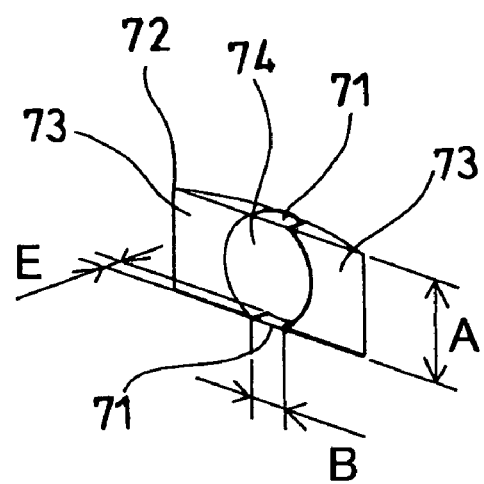
FIG. 17B is a schematic perspective view showing a joint structure according to the sixth embodiment.

In the sixth embodiment shown in FIGS. 15, 16A and 16B, the throttle valve 1 has a first flat section (substantially linear section, substantially flat section, notch section, groove) 14a and a second flat section 14b, in addition to the first and second annular end faces 15a, 15b. The first and the second flat sections 14a, 14b are respectively formed on both end sides in the outer circumferential periphery of the resinous disc part 14 of the throttle valve 1 to extend in parallel with the central axis of the bore inner pipe 31 of the throttle body 5, when the throttle valve 1 is in its full open position.

A first body joint (not shown) is insert molded in a portion of the bore inner periphery 8 of the bore wall part 6 of the throttle body 5, which is located in the vicinity of the first valve bearing 41, i.e., in the vicinity of the first shaft hole of the bore inner periphery 8. The first body joint has a first slit that is an opening arranged in parallel with the central axis of the bore inner pipe 31 of the throttle body 5. A second body joint 72 is insert molded (inserted and formed) in a portion of the bore inner periphery 8 of the bore wall part 6 of the throttle body 5, which is located in the vicinity of the second valve bearing 42, i.e., in the vicinity of the second shaft hole 44 of the bore inner periphery 8. The second body joint 72 has a second slit 71 (groove, substantially flat section, substantially linear section) that is an opening arranged in parallel with the central axis of the bore inner pipe 31 of the throttle body 5.

The first body joint and the second body joint 72 are formed of a material, which is not adhesive to a material, e.g., thermoplastic formed to be the throttle valve 1 and the throttle body 5. That is, the material of both the first body joint and the second body joint 72 does not have compatibility with the material of both the throttle valve 1 and the throttle body 5. Specifically, the first body joint and the second body joint 72 can be formed of a metallic material such as brass, oil-less metal and copper, for example.

A flat-shaped first seal and a second seal 73 are respectively provided in both the first body joint and the second body joint 72 to airtightly seal between the outer circumferential periphery of the throttle valve 1 and the bore inner periphery 8 of the bore inner pipe 31, when the throttle valve 1 is in its full close position. A first shaft hole and a second shaft hole 74 are respectively formed in the first seal and the second seal 73 to rotatably support the first and second bearing sliding parts of the throttle shaft 2 to be slidable with each other.

The first seal and the second seal 73 of the first body joint and the second body joint 72 respectively oppose with respect to the first and the second flat sections 14a, 14b of the throttle valve 1, when the throttle valve 1 is in its full close position. In this situation, the first seal of the first body joint of the bore inner periphery 8 and the first flat section 14a of the throttle valve 1 may be apart from each other by a predetermined distance to secure a clearance, through which the molding dies pass. Besides, the second seal 73 of the second body joint 72 and the second flat section 14b of the throttle valve 1 may be apart from each other by a predetermined distance.

Both the first shaft hole and the second shaft hole 74 are respectively formed in a substantially axially central portion of the bore inner pipe 31. That is, both the first shaft hole and the second shaft hole 74 are formed in a portion of the outer periphery 31a of the bore inner pipe 31, to which the annular connecting part 33 connects.

The first shaft hole of the bore inner periphery 8 communicates between a portion of the first slit of the bore inner periphery 8 on the upstream side and a portion of the first slit on the downstream side along intake airflow. The first shaft hole of the bore inner periphery 8 has the same inner diameter as that of the first shaft hole 43, and is coaxially arranged with respect to the first shaft hole 43 of the first bearing 41. The second shaft hole 74 of the bore inner periphery 8 communicates between a portion of the second slit 71 of the bore inner periphery 8 on the upstream side and a portion of the second slit 71 on the downstream side along intake airflow. The second shaft hole 74 of the bore inner periphery 8 has the same inner diameter as that of the second shaft hole 44 of the second bearing 42, and is coaxially arranged with respect to the second shaft hole 44.

In this joint structure between the throttle valve 1 and the throttle body 5, the first slit and the second slit 71 are respectively formed in a portion of the first body joint and the second body joint 72, in which the first body joint and the second body joint 72 contact the throttle valve 1. The molding dies (movable die 272), which form the bore inner periphery 8 of the bore inner pipe 31 of the throttle body 5, is pulled out along the first slit and the second slit 71 after the throttle body 5 and the throttle valve 1 are molded. Therefore, a large space can be formed between the outer circumferential periphery of the throttle valve 1 and the bore inner periphery 8 of the bore inner pipe 31 of the throttle body 5, through which the molding dies can pass. Accordingly, the molding dies can be thick members, which form a portion between the throttle valve 1 and the throttle body, so that durability of the molding dies can be enhanced.

When the throttle valve 1 and the bore wall part 6 of the throttle body 5 are simultaneously molded of a resinous material in the same molding dies, the throttle valve 1 does not directly contact the bore inner periphery 8 of the bore inner pipe 31 of the throttle body 5. In this situation, a predetermined gap can be formed between the throttle valve 1 and the bore inner periphery 8 of the bore inner pipe 31 of the throttle body 5 using the molding dies.

Here, a dimension A is defined as the length of both the first shaft hole of the first body joint of the bore inner periphery 8 of the bore inner pipe 31 and the second shaft hole 74 of the second body joint 72 in the axial direction of the bore inner pipe 31. A dimension B is defined as the width of both the first slit of the first body joint 72 of the bore inner periphery 8 of the bore inner pipe 31 and the second slit 71 of the second body joint 72. A dimension C is defined as the outer diameter of the throttle shaft 2. A dimension D is defined as the board thickness of both the first flat section 14a of the resinous disc part 14 of the throttle valve 1 and the second flat section 14b. A dimension E is defined as the depth of both the first slit of the first body joint of the bore inner periphery 8 and the second slit 71 of the second body joint 72. Here, the depth of both the first slit and the second slit 71 is a depth in the wall thickness direction of the first body joint and the second body joint 72, i.e., the radial direction of the bore inner periphery 8 of the bore inner pipe 31. Relations among the dimensions A to E are described as follows.

$$\text{dimension A} \geq \text{dimension C} \quad (5)$$

$$\text{dimension D} \leq \text{dimension B} \quad (6)$$

$$0 < \text{dimension E} \quad (7)$$

When the joint structure is used, and the dimensions A to E satisfies the relations (5) to (7), the throttle valve 1 and the bore inner pipe 31 of the throttle body 5 can be completely partitioned using the molding dies. Therefore, the throttle valve 1 and the bore wall part 6 of the throttle body 5 can be simultaneously molded in the same molding dies. Besides, a predetermined gap can be formed between the throttle valve 1 and the bore inner periphery 8 of the bore wall part 6 of the throttle body 5 using the molding dies.

The throttle shaft (metallic shaft) 2 is insert molded (inserted and formed) in the resinous shaft part 15 of the throttle valve 1 when the resinous shaft part 15 and the bore inner pipe 31 are simultaneously molded. Therefore, the throttle valve 1 and the bore inner pipe 31 are completely separated at both ends of the throttle shaft 2, i.e., the first and second bearing sliding parts, in which the resinous shaft part 15 and the bore inner pipe 31 are connected with each other via the throttle shaft (metallic shaft) 2. Therefore, the throttle body 5 and the resinous shaft part 15 can be partitioned by the molding dies and separated from each other by the throttle shaft (molding member) 2. Thus, the throttle valve 1 and the throttle body 5 can be simultaneously molded in the same molding dies.

The throttle shaft 2 can be formed of a material, e.g. ceramic material, which is not adhesive to a material, e.g., thermoplastic formed to be the throttle valve 1 and the throttle body 5. That is, the material of the throttle shaft 2 and the material of both the throttle valve 1 and the throttle body 5 do not have compatibility with each other, so that similar effect can be obtained. The throttle shaft 2 can be molded of the same material as that of the throttle valve 1 to construct a substantially round-bar shaped resinous shaft part 16.

Seventh Embodiment

Figure 18:
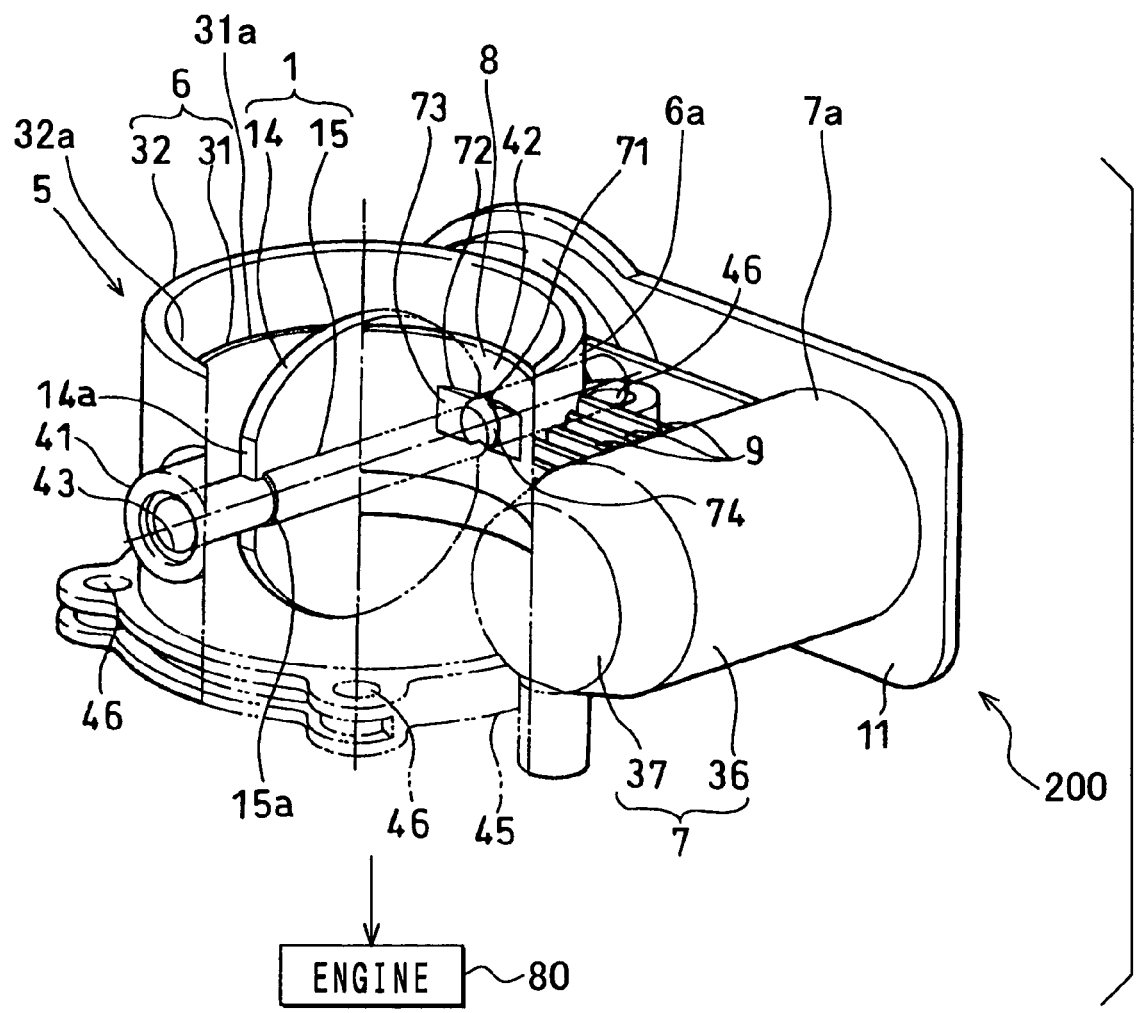
FIG. 18 is a perspective view showing an electrically controlled throttle apparatus according to a seventh embodiment of the present invention.

In the seventh embodiment shown in FIG. 18, the throttle apparatus, which is substantially the same as that of the sixth embodiment, has the throttle shaft 2 that is a metallic shaft similarly to the first to fourth embodiments.

Eighth Embodiment

Figure 19:
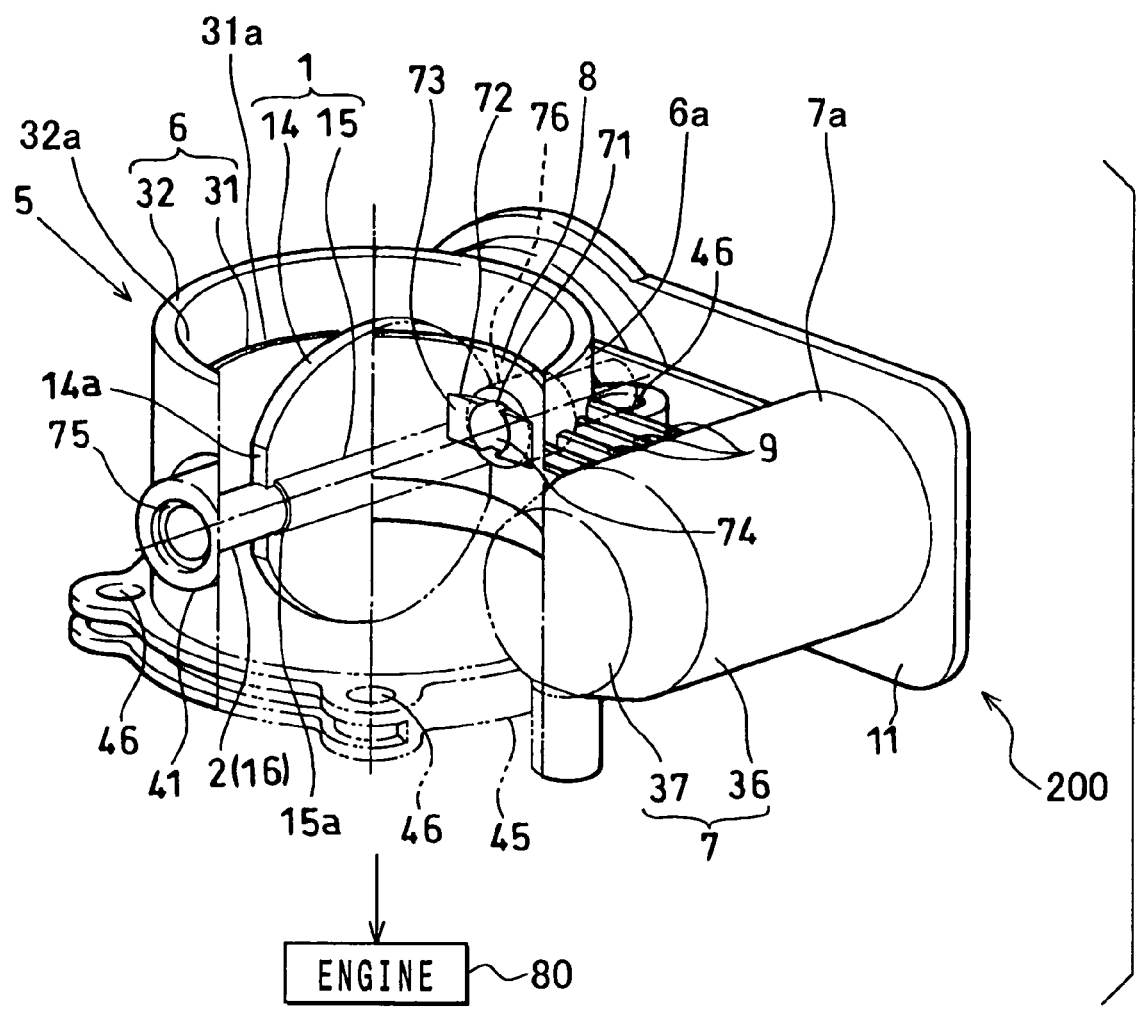
FIG. 19 is a perspective view showing an electrically controlled throttle apparatus according to an eighth embodiment of the present invention.

In the eighth embodiment shown in FIG. 19, a substantially cylindrical first collar 75 and a substantially cylindrical second collar 76 are provided in the bore wall part 6 of the throttle body 5, in addition to the first body joint and the second body joint 72 described in the sixth embodiment. Specifically, the first and second collars 75, 76 are respectively insert molded (inserted and formed) in the internal peripheries of the first and second valve bearings 41, 42 of the bore wall part 6 for rotatably supporting the first and the second bearing sliding parts of the throttle shaft 2 respectively.

The first and second collars 75, 76 are formed of a material, which is not adhesive to a material, e.g., thermoplastic formed to be the throttle valve 1 and the throttle body 5. That is, the material of both the first and second collars 75, 76 does not have compatibility with the material of both the throttle valve 1 and the throttle body 5. Specifically, the first and second collars 75, 76 can be formed of a metallic material such as brass, oil-less metal and copper, for example.

A first shaft hole is formed in the first collar 75 coaxially with respect to both the first shaft hole 43 of the first valve bearing 41 and the first shaft hole of the first body joint. A second shaft hole is formed in the second collar 76 coaxially with respect to both the second shaft hole 44 of the second valve bearing 42 and the second shaft hole 74 of the second body joint 72.

The throttle shaft 2 can be formed of a material, e.g. ceramic material, which is not adhesive to a material, e.g., thermoplastic formed to be the throttle valve 1 and the throttle body 5. That is, the material of the throttle shaft 2 and the material of both the throttle valve 1 and the throttle body 5 do not have compatibility with each other, so that a similar effect can be obtained. Substantially cylindrical dry bearings (bearing part) can be used instead of the first and second collars 75, 76. The throttle shaft 2 can be molded of the same material as that of the throttle valve 1 to construct a substantially round-bar shaped resinous shaft part 16.

Ninth Embodiment

Figure 20:
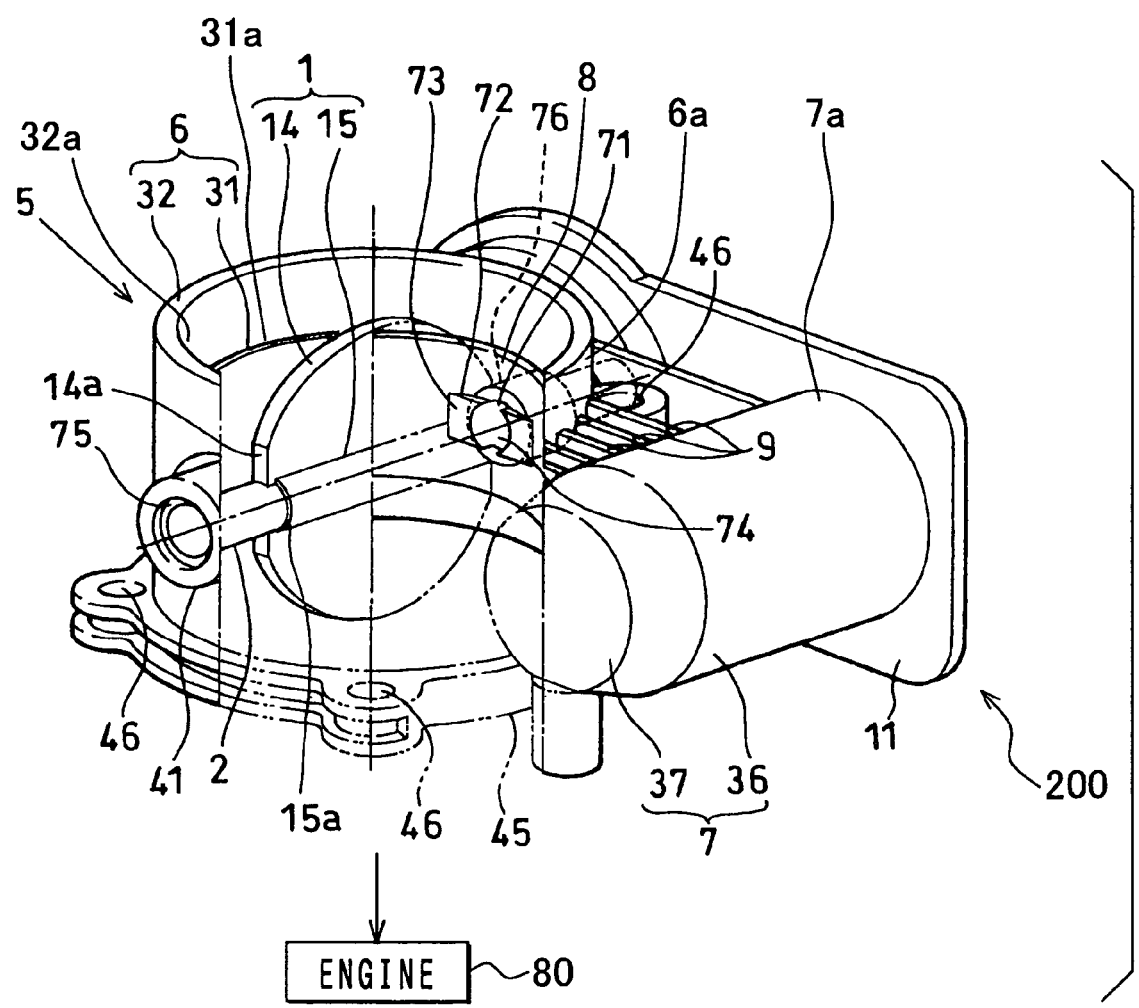
FIG. 20 is a perspective view showing an electrically controlled throttle apparatus according to a ninth embodiment of the present invention.

In the ninth embodiment shown in FIG. 20, the throttle apparatus, which is substantially the same as that of the eighth embodiment, has the throttle shaft 2 that is a metallic shaft similarly to the first to fourth embodiments.

For example, the throttle valve 1 can be formed of a material, which is not adhesive to a material of the bore wall part 6 of the throttle body 5. That is, the material of the throttle valve 1 and the material of the bore wall part 6 of the throttle body 5 do not have compatibility with each other. In this case, the throttle valve 1 and the bore wall part 6 can be molded in the same molding dies, using the above joint structure in the fourth to ninth embodiments. Therefore, the throttle shaft (metallic shaft) 2 need not to be insert molded in the throttle valve 1. Besides, the first body joint, the second body joint 72 and the first and the second collars 75, 76 need not to be insert molded in the bore wall part 6 of the throttle body 5. The throttle valve 1 can be molded after molding the throttle body 5, while the molding dies are clamped with each other. Alternatively, the throttle body 5 can be molded after molding the throttle valve 1, while the molding dies are clamped with each other.

Other Embodiment

A hall IC or a magnetoresistive element or the like can be used as a noncontact sensor, instead of the hall element. A cylindrical-shaped permanent magnet can be used as a magnetic field source, instead of the separated permanent magnets 10. A substantially disc-shaped resinous disc part (disc-shaped part) 14 can construct a throttle valve (resinous valve) 1, and a substantially cylindrical shaped resinous shaft part (cylindrical-shaped part) 15 and a substantially round bar shaped metallic shaft part 16 can construct a throttle shaft 2. A resinous shaft can be used as the throttle shaft 2 instead of the metallic shaft 2 used in the first to fourth embodiments. In this case, the resinous shaft part 15 can be integrally molded of a resinous material to construct the throttle valve 1, so that the number of components of the throttle valve 1 can be reduced.

The above throttle body 5 may be applied to a throttle apparatus, which does not have a driving motor 3, used for an internal combustion engine. In this case, a lever part, which is mechanically connected to an accelerator pedal via a wire cable, is provided instead of the valve gear 13 that is provided on the end of the metallic shaft part 16 of the throttle shaft 2. In this structure, the accelerator position operated by a driver can also be transmitted to the throttle valve 1 and the throttle valve 2.

The outer periphery of the valve supporting portion of the throttle shaft 2 can be knurled partially or entirely. That is, a rough surface can be formed on the outer periphery of the valve supporting portion, so that a sticking characteristic (connecting performance) can be enhanced between the inner periphery of the resinous shaft part 15 of the throttle valve 1 and the outer periphery of the valve supporting portion of the throttle shaft 2. Namely, a serration, notches, grooves or the like are partially or entirely formed on the outer periphery of the valve supporting portion, so that relative displacement are restricted between the throttle valve 1 and the throttle shaft 2 in the axial direction thereof. Thus, the throttle valve 1 can be prevented from being pulled out of the valve supporting portion of the throttle shaft 2. Alternatively, the cross-section of the valve supporting portion of the throttle shaft 2 can be formed in a substantially circular shape having a bolt width. In this structure, the valve supporting portion of the throttle shaft 2 has substantially parallel flat faces along with its axial direction. Alternatively, the cross-section of the resinous shaft part 15 of the throttle valve 1 can be formed in a substantially cylindrical shape having a bolt width. In this structure, resinous shaft part 15 has substantially parallel flat faces along with its axial direction. In this case, relative displacement can be restricted between the throttle valve 1 and the throttle shaft 2 in the rotation direction thereof.

Before the throttle valve 1 and the throttle body 5 are simultaneously molded in the same molding dies, mold lubricant (parting agent, release agent) or lubricity agent such as fluorocarbon resin (fluoroplastic) or molybdenum disulfide can be painted on outer peripheral faces of both the first and second bearing sliding part located on both ends of the throttle shaft 2.

Similarly, mold lubricant (parting agent, release agent) or lubricity agent such as fluorocarbon resin (fluoroplastic) or molybdenum disulfide can be painted on inner peripheral faces of both the first shaft hole of the first body joint and the second shaft hole 74 of the second body joint 72.

Similarly, mold lubricant (parting agent, release agent) or lubricity agent such as fluorocarbon resin (fluoroplastic) or molybdenum disulfide can be painted on inner peripheral faces of both the first shaft hole of the first collar 75 and the second shaft hole of the second collar 76.

The central axis of the bore inner pipe 31 can be eccentrically arranged with respect to the central axis of the bore outer pipe 32 to construct the bore wall part 6 having an eccentric double-pipe structure. That is, the axial center of the bore inner pipe 31 can be eccentrically arranged on an internally one side of the bore outer pipe 32 in the radial direction of the bore outer pipe 32, e.g., vertically lower side of the bore outer pipe 32 in its installation condition. Here, the radial direction of the bore wall part 6 is perpendicular to the axial direction of the bore wall part 6. Alternatively, the axial center of the bore inner pipe 31 can be eccentrically arranged on internally another side of the bore outer pipe 32 in the radial direction of the bore outer pipe 32, e.g., vertically upper side of the bore outer pipe 32 in its installation condition.

The bore wall part 6 of the throttle body 5 can be formed to be a single pipe structure.

The blockade recess parts 34, 35 are formed between the bore inner pipe 31 and the bore outer pipe 32 for blocking moisture or liquid flowing into the bore wall part 6 from both of the upstream and the downstream sides of the throttle valve 1. The blockade recess parts 34, 35 are used to restrict the throttle valve 1 from icing in a cold period such as winter, without additional components, such as an additional piping member for introducing engine-cooling water into the throttle body 5. Alternatively, only the blockade recess part 34 can be provided in the bore wall part 6 for blocking moisture or liquid flowing from the upper side of the throttle valve 1 into the bore wall part 6 along with the inner periphery of the intake pipe. Thus, the number of the parts of the throttle apparatus can be decreased, so that the throttle apparatus can be downsized, and can be produced at a low cost.

A bypass passage can be provided on the outer peripheral side of the bore outer pipe 32 for bypassing the throttle valve 1. Furthermore, an idling speed control valve (ISC valve) can be provided in the bypass passage for controlling idling speed of the engine 80 by adjusting a flow amount of air passing through the bypass passage. An outlet port of blowby gas discharged from a positive crankcase ventilator (PCV) or a purge tube connected to a vapor recovery equipment for recovering vaporized gasoline may be connected to the intake pipe located on the upstream side of intake airflow with respect to the bore wall part 6 of the throttle body 5. In this case, engine oil contained in blowby gas may accumulate to be deposit on the inner wall of the intake pipe. However, in this structure, foreign material such as mist or deposit of blowby gas flowing along with the inner wall of the intake pipe can be blocked by the blockade recess part 34, so that the throttle valve 1 and the throttle shaft 2 can be restricted from occurrence of a failure.

The filler, which is formed to be the throttle body 5 can be a metallic material such as aluminum alloy or magnesium alloy.

The throttle body 5 and the throttle valve 1 can be integrally formed by resin molding or metal casting.

The filler can be simultaneously injected from plural gates into the cavities 201, 202 of the dies while the dies are clamped with each other in the filling process and/or the pressure holding process. Alternatively, the filler can be injected from the plural gates into the cavities 201, 202 of the dies by multiple times while the dies are clamped with each other in the filling process and/or the pressure holding process.

Various modifications and alternations may be made to the above embodiments without departing from the spirit of the present invention.

What is claimed is:

1. A forming method of a throttle apparatus for an internal combustion engine, the throttle apparatus including a substantially tubular throttle body and a substantially disc-shaped throttle valve, the throttle valve having a rotation axis substantially perpendicular to a central axis of the throttle body, the forming method of the throttle apparatus comprising:

forming the throttle body and the throttle valve substantially simultaneously using same dies such that the throttle body rotatably receives the throttle valve that is rotated by a predetermined angle with respect to a full close position, in which the throttle valve and the throttle body defines a minimum gap therebetween.

2. A forming method of a throttle apparatus according to claim 1, wherein intake air introduced into the internal combustion engine flows through the throttle body along the central axis of the throttle body.

3. A forming method of a throttle apparatus according to claim 1, wherein the throttle valve is rotated by the predetermined angle with respect to the full close position such that a portion of the radially outer circumferential periphery of the throttle valve, which substantially perpendicularly crosses the rotation axis of the throttle valve, becomes substantially parallel to the central axis of the throttle body.

4. A forming method of a throttle apparatus according to claim 1, wherein the throttle valve is rotated by the predetermined angle with respect to the full close position such that the predetermined angle substantially corresponds to a full open position of the throttle valve.

5. A forming method of a throttle apparatus according to claim 1, wherein the dies define a cavity having a shape corresponding to the throttle body and the throttle valve, which are formed, the cavity is filled with a filler, which is heated to be in a molten state, the filler filled in the cavity is cooled to be solidified to form the throttle body and the throttle valve, and the filler is one of thermo plastic, aluminum alloy and magnesium alloy.

6. A forming method of a throttle apparatus according to claim 1, wherein the throttle body and the throttle valve are formed using one of resin molding and metal casting.

7. A forming method of a throttle apparatus according to claim 1, wherein the throttle body has a valve bearing that rotatably supports at least one end of the rotation axis of the throttle valve, and the throttle body has at least one of a groove, a substantially flat section and a substantially linear section, which is located in a bore inner periphery in the vicinity of the valve bearing, to be substantially parallel to the central axis of the throttle body.

8. A forming method of a throttle apparatus according to claim 1, wherein the throttle valve has a substantially axial shaped shaft that integrally rotate with the throttle valve, and the throttle valve has an annular end face, which is located in the vicinity of an axial end of the shaft to be axially recessed from an outer circumferential periphery of the throttle valve by a predetermined length.

9. A forming method of a throttle apparatus according to claim 1, wherein the throttle valve has at least one of a groove, a substantially flat section and a substantially linear section, which is located in an axially end portion of the throttle valve to be substantially parallel to the central axis of the throttle body.

10. A forming method of a throttle apparatus according to claim 1, wherein the throttle body has a body joint that airtightly connects an outer circumferential periphery of the throttle valve and a bore inner periphery of the throttle body when the throttle valve is in the full close position, the body joint is inserted and formed in the throttle body, the body joint is formed of a material, which is not adhesive to a material of the throttle body and the throttle valve, and the material of the body joint does not have compatibility with the material of the throttle body and the throttle valve.

11. A forming method of a throttle apparatus according to claim 1, wherein the throttle valve has a substantially axial shaped shaft that integrally rotates with the throttle valve, the shaft is inserted and formed in the throttle valve, the shaft is formed of a material, which is not adhesive to a material of the throttle body and the throttle valve, and the material of the shaft does not have compatibility with the material of the throttle body and the throttle valve.

12. A forming method of a throttle apparatus according to claim 1, wherein the throttle body has at least one of a substantially cylindrical collar and a substantially cylindrical dry bearing that is inserted and formed in the throttle body to rotatably support at least one end of the rotation axis of the throttle valve, the collar and the dry bearing are formed of a material, which is not adhesive to a material of the throttle body and the throttle valve, and the material of the collar and the dry bearing does not have compatibility with the material of the throttle body and the throttle valve.

13. A throttle apparatus for an internal combustion engine, the throttle apparatus comprising:

a substantially tubular throttle body; and a substantially disc-shaped throttle valve that has a rotation axis substantially perpendicular to a central axis of the throttle body, wherein the throttle body has a valve bearing that rotatably supports at least one end of the rotation axis of the throttle valve, and the throttle body has at least one of a groove, a substantially flat section and a substantially linear section, which is located in a bore inner periphery in the vicinity of the valve bearing, to be parallel to the central axis of the throttle body.

14. A throttle apparatus according to claim 13, wherein intake air introduced into the internal combustion engine flows through the throttle body along the central axis of the throttle body.

15. A throttle apparatus according to claim 13, wherein the throttle valve has a substantially axial shaped shaft that integrally rotate with the throttle valve, and the throttle valve has an annular end face, which is located in the vicinity of an axial end of the shaft to be axially recessed from an outer circumferential periphery of the throttle valve by a predetermined length.

16. A throttle apparatus according to claim 13, wherein the throttle valve has at least one of a groove, a substantially flat section and a substantially linear section, which is located in an axially end portion of the throttle valve to be substantially parallel to the central axis of the throttle body.

17. A throttle apparatus according to claim 13, wherein
the throttle body has a body joint that airtightly connects an outer circumferential periphery of the throttle valve and the bore inner periphery of the throttle body when the throttle valve is in a full close position,
the body joint is integrally formed in the throttle body,
the body joint is formed of a material, which is not adhesive to a material of the throttle body and the throttle valve, and
the material of the body joint does not have compatibility with the material of the throttle body and the throttle valve.

18. A throttle apparatus according to claim 13, wherein
the throttle valve has a substantially axial shaped shaft that integrally rotates with the throttle valve,
the shaft is integrally formed in the throttle valve,
the shaft is formed of a material, which is not adhesive to a material of the throttle body and the throttle valve, and
the material of the shaft does not have compatibility with the material of the throttle body and the throttle valve.

19. A throttle apparatus according to claim 13, wherein
the throttle body has at least one of a substantially cylindrical collar and a substantially cylindrical dry bearing, which is integrally formed in the throttle body, to rotatably support at least one end of the rotation axis of the throttle valve,
the collar and the dry bearing are formed of a material, which is not adhesive to a material of the throttle body and the throttle valve, and
the material of the collar and the dry bearing does not have compatibility with the material of the throttle body and the throttle valve.

20. A throttle apparatus according to claim 13, wherein the throttle body includes a bore wall part having a double pipe structure including a substantially cylindrical outer pipe that is arranged on a radially outer side of a substantially cylindrical inner pipe, which defines an intake air passage, to define a cylindrical space with an outer periphery of the inner pipe.

21. A throttle apparatus according to claim 13, wherein
the throttle body is formed of one of thermo plastic, aluminum alloy and magnesium alloy, and
the throttle valve is formed of a same material of the material forming the throttle body.

* * * * *